US012803970B2

(12) United States Patent
Joshi et al.

(10) Patent No.: US 12,803,970 B2
(45) Date of Patent: Nov. 17, 2026

(54) CERTIFICATE OPERATOR FOR KUBERNETES BASED APPLICATIONS

(71) Applicant: Dell Products L.P., Round Rock, TX (US)

(72) Inventors: Abhidnya Sushant Joshi, Pune (IN); Hema Basavaraju, Bangalore (IN); Suma L, Bangalore (IN); Mandvi Pande, Ujjain (IN); Neha Verma, New Delhi (IN)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/628,488

(22) Filed: Apr. 5, 2024

(65) Prior Publication Data

US 2025/0317433 A1 Oct. 9, 2025

(51) Int. Cl.
*H04L 29/06* (2006.01)
*H04L 9/40* (2022.01)

(52) U.S. Cl.
CPC ................................ *H04L 63/0823* (2013.01)

(58) Field of Classification Search
CPC ................................................... H04L 63/0823
See application file for complete search history.

(56) References Cited

U.S. PATENT DOCUMENTS 11,496,323 B1 * 11/2022 Caceres ................ H04L 9/3263
12,695,737 B2 * 7/2026 Jhaveri ............... H04L 63/0823
2005/0074124 A1 * 4/2005 Thornton ................ H04L 63/04 380/277
2006/0075219 A1 * 4/2006 Callaghan ............. H04L 63/166 713/156
2020/0112487 A1 * 4/2020 Inamdar ................ H04L 41/082
2020/0287724 A1 * 9/2020 Vaddi .................... H04L 9/0894
2021/0103499 A1 * 4/2021 Alluboyina ......... G06F 11/1464
2021/0203731 A1 * 7/2021 Garty .................. H04L 41/0853
2022/0239503 A1 * 7/2022 Mallikarjuna Durga Lokanath .... H04L 9/0891
2023/0185580 A1 * 6/2023 Cohen ....................... G06F 8/63 713/2

(Continued)

OTHER PUBLICATIONS

Ali Kanso et al., Designing a Kubernetes Operator for Machine Learning Applications, Dec. 6, 2021, ACM, pp. 7-12. (Year: 2021).*

(Continued)

*Primary Examiner* — Luu T Pham
*Assistant Examiner* — Fahimeh Mohammadi
(74) *Attorney, Agent, or Firm* — Chamberlain, Hrdlicka, White, Williams & Aughtry; Aly Z. Dossa

(57) ABSTRACT

A method for managing network traffic in a Kubernetes cluster includes: generating, by a master node of a cluster, at least one initial cluster certificate using at least one cluster identity parameter, wherein: the cluster includes worker nodes, the worker nodes host pods, the pods include containers, and the containers include services; performing authentication for the cluster using the at least one initial cluster certificate; making a determination that a cluster certificate update is required; in response to the determination: obtaining an updated certificate; replacing the at least one initial cluster certificate using the updated certificate; and performing authentication for the cluster using the updated certificate.

18 Claims, 9 Drawing Sheets

(56) References Cited

U.S. PATENT DOCUMENTS

| | | | | |
|---|---|---|---|---|
| 2024/0275776 | A1* | 8/2024 | Corbel | H04L 63/0807 |
| 2024/0427908 | A1* | 12/2024 | Huo | G06F 21/53 |
| 2025/0053440 | A1* | 2/2025 | Ramakrishnan | G06F 9/4881 |
| 2025/0233757 | A1* | 7/2025 | Fromentoux | H04L 9/3263 |
| 2025/0247232 | A1* | 7/2025 | Katiyar | H04L 9/3213 |
| 2025/0265174 | A1* | 8/2025 | Hasan | G06F 11/3644 |
| 2025/0294021 | A1* | 9/2025 | Horwitz | H04L 63/083 |

OTHER PUBLICATIONS

Hugo Kermabon-Bobinnec et al., ProSPEC: Proactive Security Policy Enforcement for Containers, Apr. 15, 2022, ACM, pp. 155-166. (Year: 2022).*

Akarsh Goel et al., Authenticating Distributed Systems Using SPIRE over Kubernetes Cluster, Aug. 30, 2022, IEEE, pp. 1-6. (Year: 2022).*

Ahmed Didouh et al., Blockchain-Based Collaborative Certificate Revocation Systems Using Clustering, Mar. 16, 2022, IEEE, vol. 10, pp. 51487-51500. (Year: 2022).*

* cited by examiner

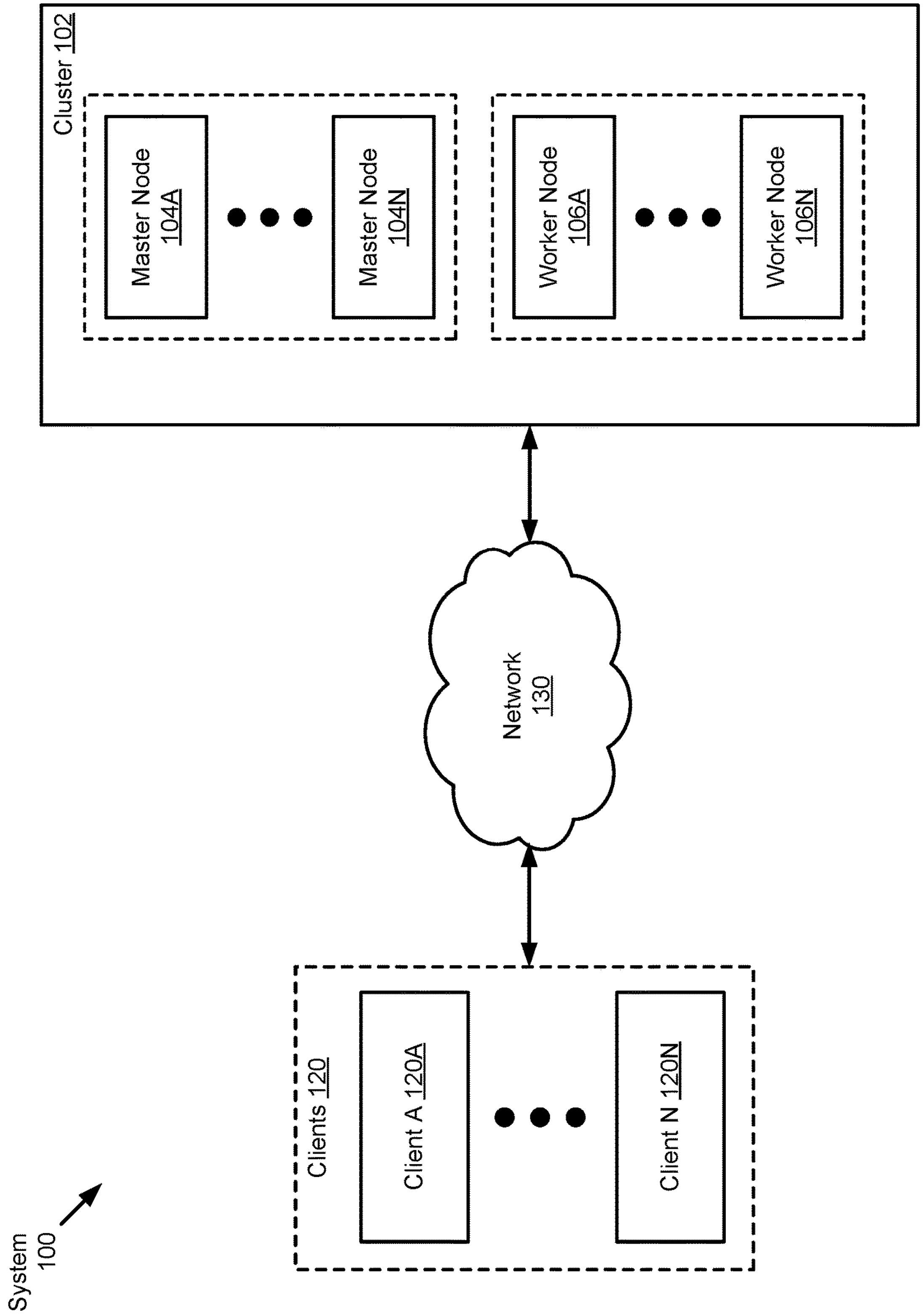
FIG. 1.1

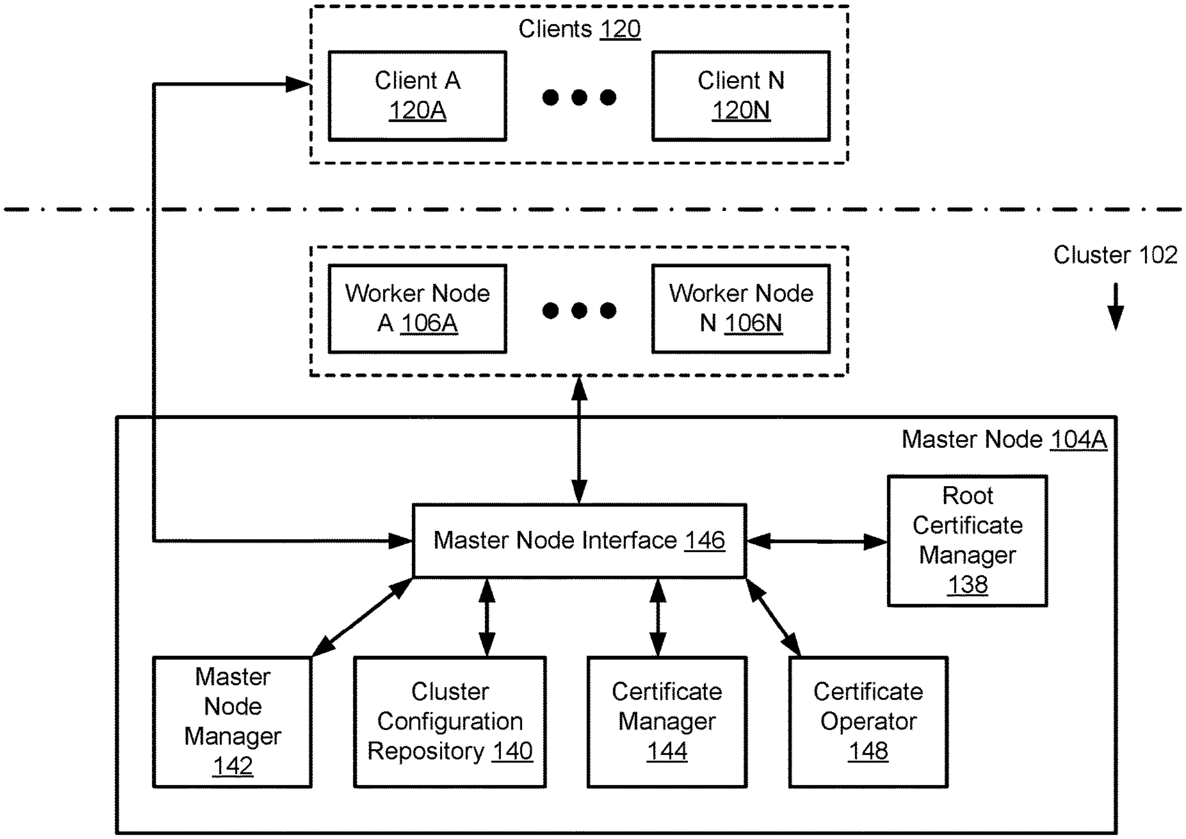
FIG. 1.2

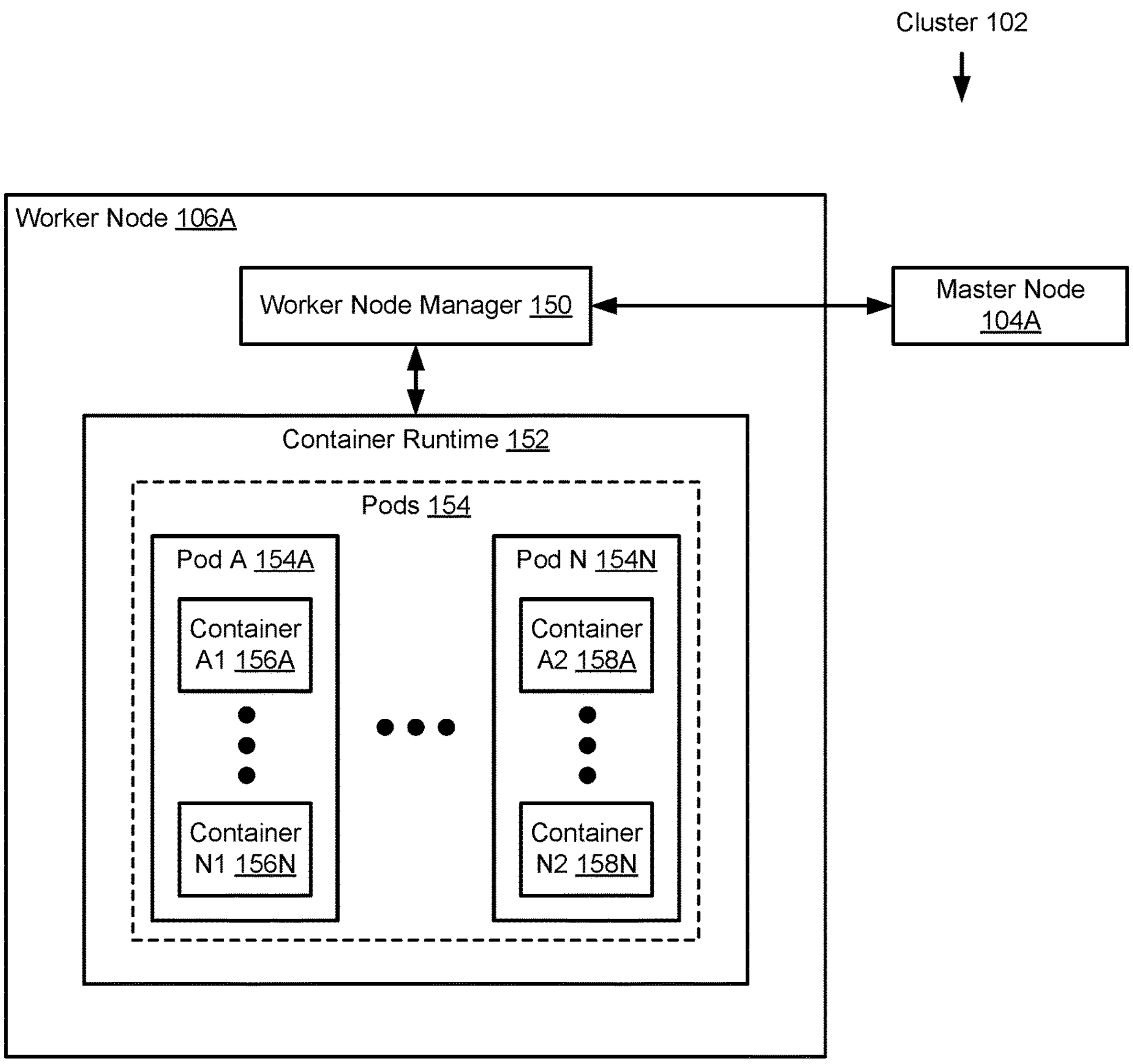
FIG. 1.3

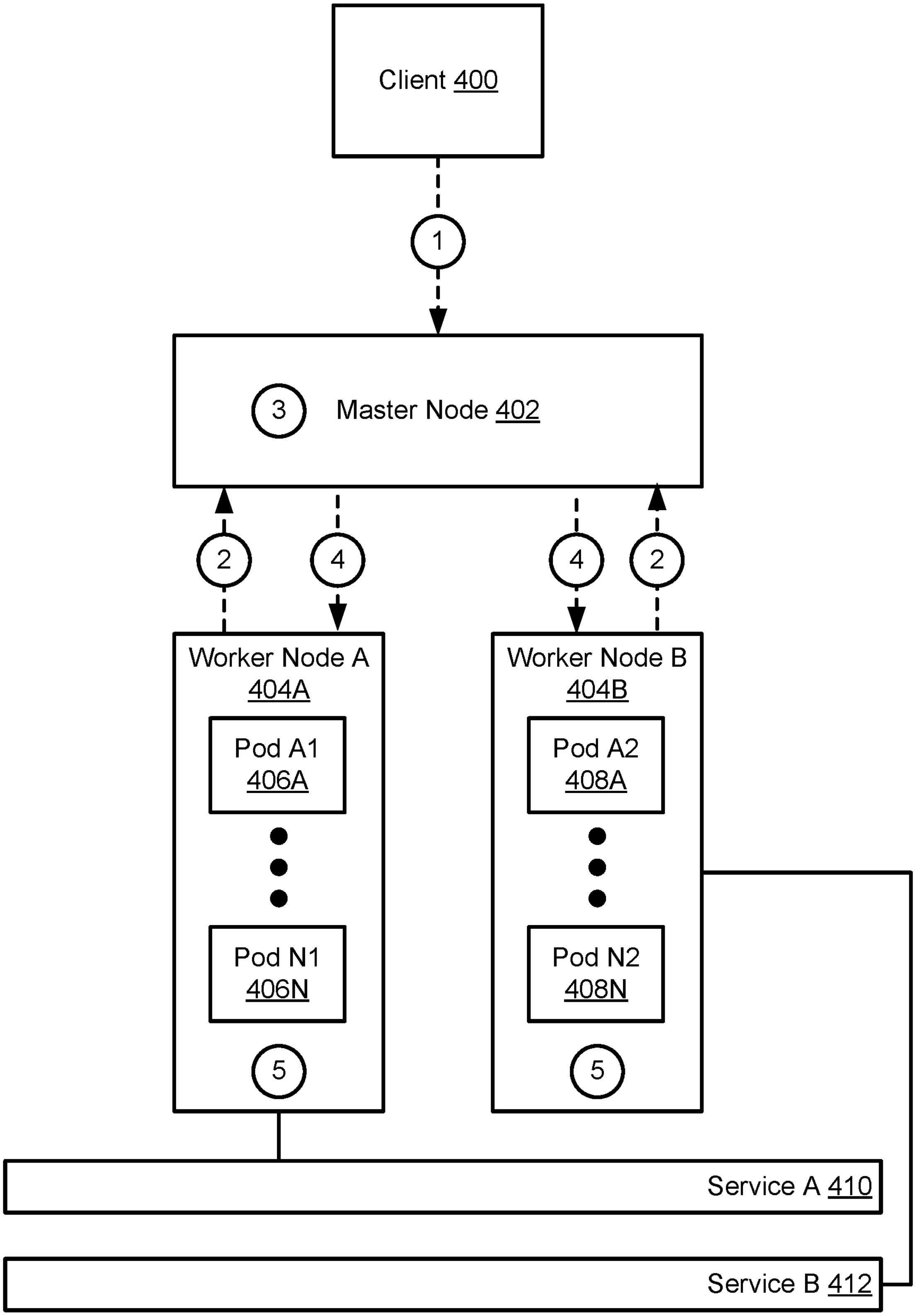
FIG. 4.1

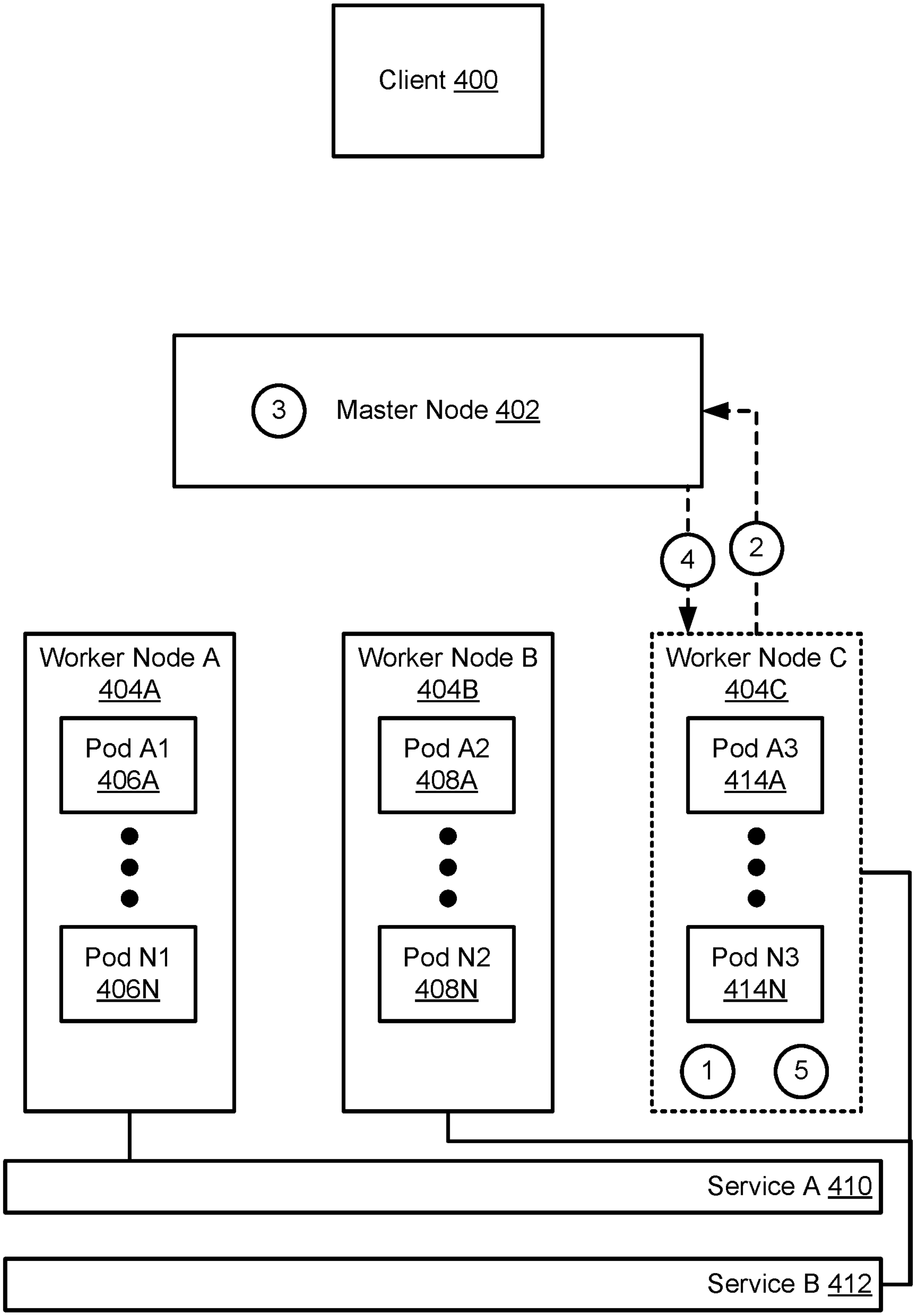
FIG. 4.2

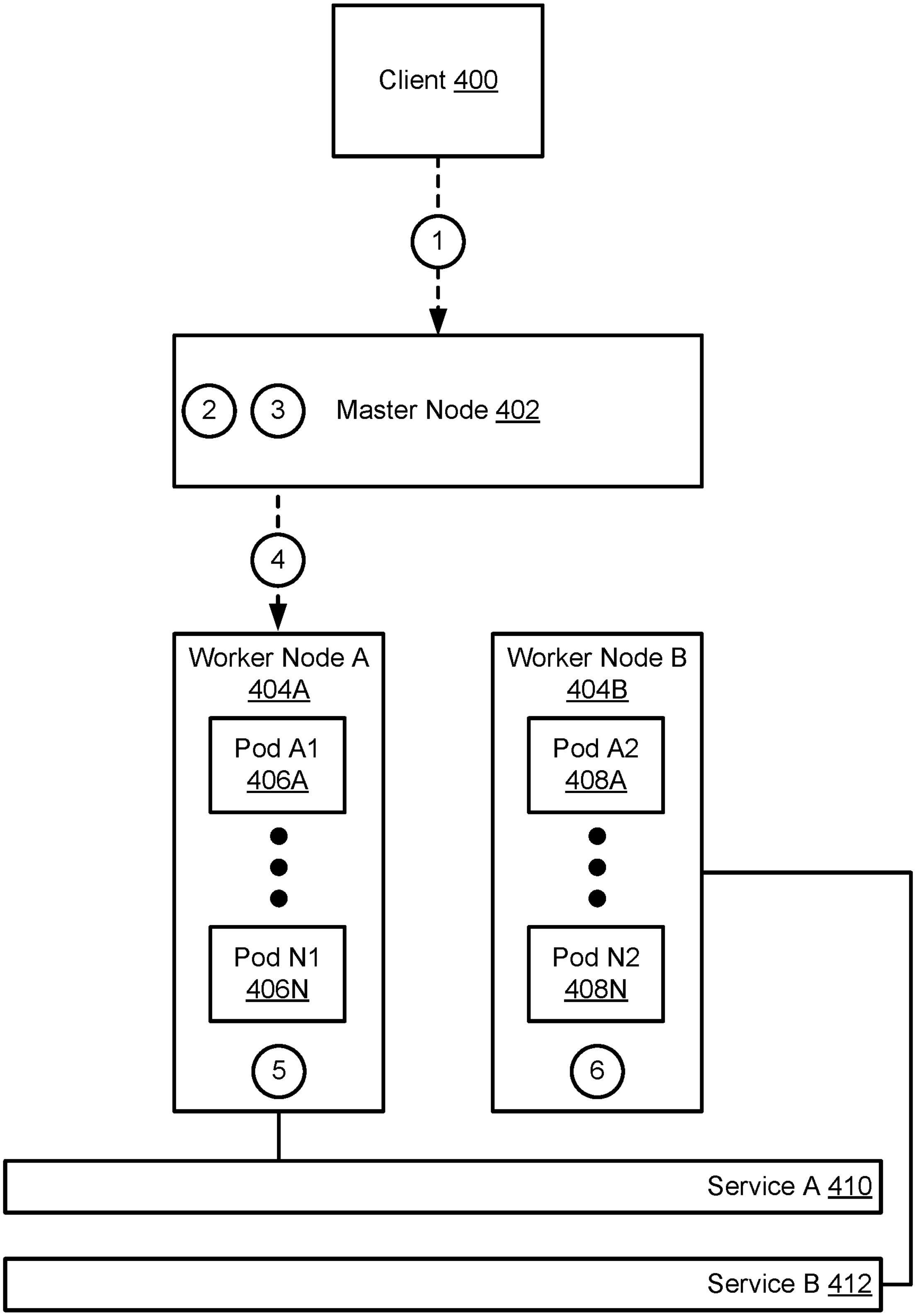
FIG. 4.3

CERTIFICATE OPERATOR FOR KUBERNETES BASED APPLICATIONS

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.1 shows a diagram of a system in accordance with one or more embodiments of the invention.

FIG. 1.2 shows a diagram of a master node in accordance with one or more embodiments of the invention.

FIG. 1.3 shows a diagram of a worker node in accordance with one or more embodiments of the invention.

FIGS. 4.1-4.3 show an example use case in accordance with one or more embodiments of the invention.

DETAILED DESCRIPTION

Figure 2:
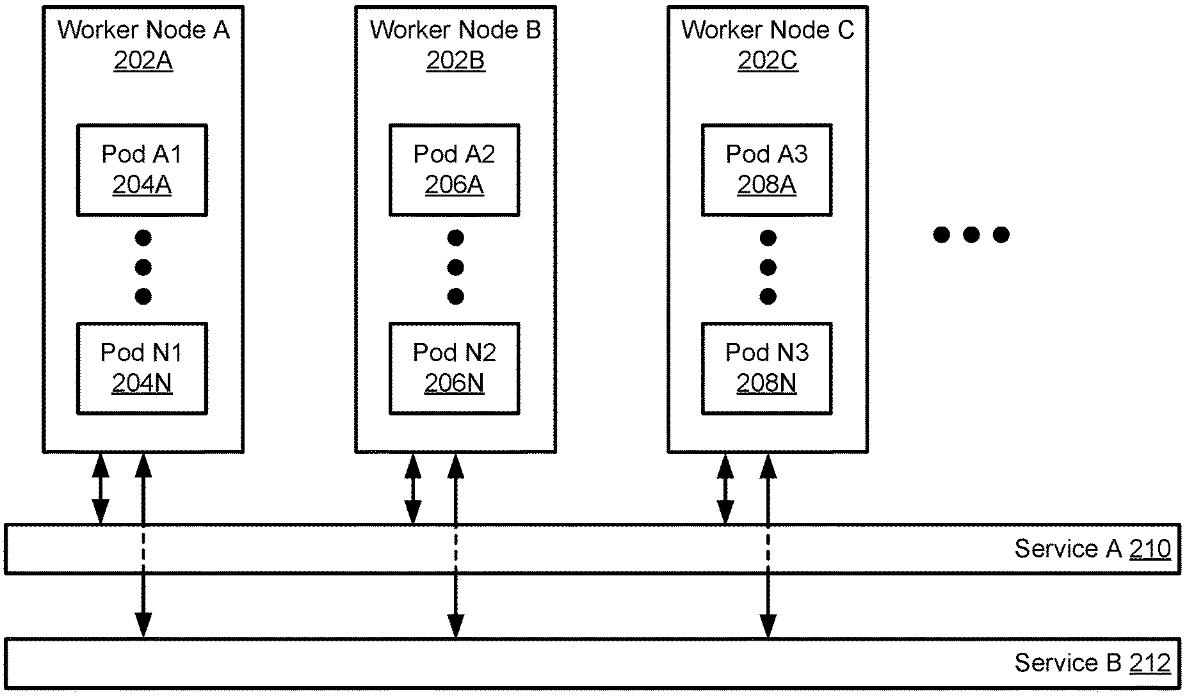
FIG. 2 shows a diagram of internal network traffic in a cluster in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase “operatively connected” may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, distributed data protection systems (or any other computing system/infrastructure) may operate based on a Kubernetes (K8s) cluster (e.g., a portable, extensible, and open-source platform for managing containerized workloads and/or services), in which the corresponding computing system may include various different sub-systems (e.g., worker nodes) that execute one or more pods. For example, Pod 1 may implement a dedupe engine that stores dedupe file system metadata (e.g., an identifier of an asset (e.g., a file, a folder, etc.), an identifier of a parent folder containing an asset, a size of an asset, one or more attributes of an asset, etc.) in Pod 2.

In Kubernetes cloud-native design, every service carries its identity. Similarly in the data protection environment, a cluster may carry its identity (e.g., fully qualified domain name, IP addresses, etc.) so that outside clients may verify their communication with the servers running within this cluster using certificates. As a result, the certificate may play an important role and carry the cluster’s identity.

Currently, there are some solutions available to statically define certificate. However, these solutions cannot fill the below requirements. First, they still do not have a way to generate a certificate which carries the identity of the cluster or its components during runtime and automatically change it if any changes happen to IPs or FQDNs, or they need manual intervention to accomplish changing certificates upon changes to the cluster. The manual methods may be very lengthy and difficult to enforce. Second, there are no direct K8s native ways to replace the certificate if the customer needs an external certificate. Such scenarios may include a customer that wants to generate a cluster certificate on his own, get it signed by his CA, and just import it at the ingress gateway or specific service which is externally accessible. Third, for each component, adding the common framework to define the certificate is difficult. Part of the security may require customizing a few details in the input parameters for certificate creation such as key size, cipher suites, rotation policies, the naming convention for the common name and SAN (subject alternate name), etc. With each component having a separate certificate, may be very challenging to enforce these changes.

To address, at least in part, the aforementioned issues discussed above, embodiments disclosed herein relate to systems, methods, and/or non-transitory computer readable mediums that implement a certificate operator that may help create a cluster certificate which can recreate itself during runtime and provides a way to replace it with customer imported certificate. The certificate operator may provide two mechanisms: (i) automatically creating and updating certificates based on changes in a cluster, and (ii) allowing replacement of it using a user-declarative import certificate. This helps pods get certificates during runtime without any disruption to services or workloads performed by the cluster.

The following describes various embodiments of the invention.

FIG. 1.1 shows a diagram of a system (100) in accordance with one or more embodiments of the invention. The system (100) includes any number of clients (120) (e.g., Client A (120A), Client B (120B), etc.), a cluster (102), and a network (130). The system (100) may facilitate, at least, management and authentication of network communications to and within the cluster (102). The system (100) may include additional, fewer, and/or different components without departing from the scope of the invention. Each component may be operably/operatively connected to any of the other components via any combination of wired and/or wireless connections. Each component illustrated in FIG. 1.1 is discussed below.

In one or more embodiments, the clients (e.g., 120A, 120B, etc.), the cluster (102), and the network (130) may be (or may include) physical hardware or logical devices, as discussed below. While FIG. 1.1 shows a specific configuration of the system (100), other configurations may be used without departing from the scope of the invention. For example, although the clients (e.g., 120A, 120B, etc.) and the cluster (102) are shown to be operatively connected through a communication network (e.g., 130), the clients (e.g., 120A, 120B, etc.) and the cluster (102) may be directly connected (e.g., without an intervening communication network).

Further, functioning of the clients (e.g., 120A, 120B, etc.) and the cluster (102) is not dependent upon the functioning and/or existence of the other components (e.g., devices) in the system (100). Rather, the clients and cluster may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing data, a cloud computing infrastructure, etc.) and may deliver at least computing power (e.g., real-time network monitoring, server virtualization, etc.), storage capacity (e.g., data backup), and data protection (e.g., software-defined data protection, disaster recovery, etc.) as a service to users (e.g., end-users) of the clients (e.g., 120A, 120B, etc.). The system (100) may also represent a comprehensive middleware layer executing on computing devices (e.g., 500, FIG. 5) that supports virtualized application and storage environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

In one or more embodiments, the system (100) may provide computer-implemented services to the users. To provide computer-implemented services to the users, the system (100) may perform some computations (e.g., data collection, distributed processing of collected data, etc.) locally (e.g., at the users' site using one or more clients (e.g., 120A, 120B, etc.)) and other computations remotely (e.g., away from the users' site using the cluster (102)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, the cluster (102) may be configured (i) for hosting any number of master nodes (e.g., 104A, 104B, etc.) and any number of worker nodes (e.g., 106A, 106B, etc.), (ii) for maintaining various workloads, and/or (iii) for providing a computing environment (e.g., computing power and storage) whereon workloads may be implemented (to provide computer-implemented services). In one or more embodiments, each component of the cluster (102) may be operably/operatively connected to any of the other components of the cluster (102) via any combination of wired and/or wireless connections. The cluster (102) may include other and/or additional components, such as a backup storage system (not shown), a persistent volume pool (not shown), communication services (not shown), etc., without departing from embodiments disclosed herein.

Details of a master node (e.g., 104A) and a worker node (e.g., 106A) are described below in reference to FIGS. 1.2 and 1.3, respectively.

As being implemented as a physical computing device or a logical computing device and with the help of the hosted components, the cluster (102) may include functionality to, e.g.: (i) operate as a reliable container orchestration platform (e.g., a Kubernetes platform that executes containers at scale for production workloads, a container lifecycle management platform that manages multi-container workloads and services deployed across the nodes, etc.); (ii) execute batch workloads (e.g., user initiated workloads, containerized workloads, etc.) in a containerized environment; (iii) provide service discovery and load balancing (e.g., the cluster may handle demand spikes and achieve higher utilization of the worker nodes by managing wasted/idle (hardware or logical) resource capacity across the worker nodes); (iv) perform storage orchestration; (v) perform automatic resource bin packing; (vi) provide secret and configuration management; (vii) execute one or more services at a global scale on, for example, hundreds of nodes (e.g., IHSs); (viii) in order to provide redundancy and failover capabilities (so that a user may execute an application in a more reliable and resilient way), spin up a newer version of the cluster in parallel and switch traffic to the newer cluster once the newer cluster is ready; (ix) operate as a provider agnostic cluster (e.g., the cluster (and its components) may operate seamlessly regardless of the underlying cloud provider); (x) let a user to manage applications that are made up of, for example, hundreds of containers and to manage those applications in different deployment environments (e.g., in physical or virtual machines, in cloud environments, in hybrid deployment environments, etc.); (xi) provide software-defined data protection; (xii) provide automated data discovery, protection, management, and recovery operations in on-premises; (xiii) provide data deduplication; (xiv) orchestrate data protection (e.g., centralized data protection, self-service data protection, etc.) through one or more graphical user interfaces (GUIs); (XV) empower data owners (e.g., users of the clients) to perform self-service data backup and restore operations from their native applications; (xvi) ensure compliance and satisfy different types of service level objectives (SLOs); (xvii) enable virtualized and cloud deployments, including automated data discovery, protection, management, and recovery operations for in-cloud workloads; (xviii) simplify VM image backups of a VM with near-zero impact on the VM; (xix) streamline data protection for applications and/or containers; (xx) increase resiliency of an organization by enabling rapid recovery or cloud disaster recovery from cyber incidents; (xxi) provide operational simplicity, agility, and flexibility for physical, virtual, and cloud-native IT environments, (xxii) support an infrastructure that is based on a network of computing and storage resources that enable the delivery of shared applications and data (e.g., a cluster may exchange data with other clusters of the same organization registered in/to the network (130) in order to, for example, participate in a collaborative workload placement); and/or (xxiii) initiate multiple data processing or protection operations in parallel (e.g., a master node (104A) may manage multiple operations (via the worker nodes (e.g., 106A, 106B, etc.)), in which each of the multiple operations may (a) manage the initiation of a respective operation and (b) operate concurrently to initiate multiple operations).

In one or more embodiments, the cluster (102) may be capable of providing a range of functionalities/services to the users of the clients (e.g., 120A, 120B, etc.). However, not all of the users may be allowed to receive all of the services. To manage the services provided to the users, a system (e.g., a certificate manager or certificate operator) in accordance with embodiments of the invention may manage the operation of a network (e.g., 130), in which the clients (e.g., 120A, 120B, etc.) are operably connected to the cluster (102). Specifically, the certificate manager and/or the certificate operator (i) may identify services to be provided by the cluster (for example, based on the number of users using the clients (e.g., 120A, 120B, etc.)) and (ii) may limit communications of the clients (e.g., 120A, 120B, etc.) to and from the provided services by authenticating communications between users of clients (e.g., 120A, 120B, etc.) and services provided by the cluster (102). For additional information regarding the authentication of communications to, from, and/or within the cluster (102) refer to FIG. 3.

In one or more embodiments, the cluster (102) may execute one or more workloads to provide the computer-implemented services. As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor (e.g., a manufacturer, a trusted third-party vendor, etc.) and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements (e.g., if the RPO is set to 1-hour, the corresponding backup operation should be performed again within 1-hour after the start time of the last backup operation of an object), recovery time objective (RTO) requirements, etc. In most cases, the user may be agnostic as to which particular target devices are used, as long as the user performance requirements are satisfied.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, a node (e.g., 104A, 106A, etc.) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data (e.g., information, intelligence, etc.) for business, management, entertainment, or other purposes. For example, a node (e.g., 104A, 106A, etc.) may be a personal computer (e.g., a desktop computer, a laptop computer, a mobile computer, a note-book computer, etc.), a personal digital assistant (PDA), a smart phone, a tablet device (or any other a consumer electronic device), a network storage device, a network server, a switch, a router (or any other network communication device), or any other suitable device, and may vary in size, shape, performance, functionality, and price.

In one or more embodiments, as being a physical computing device or a logical computing device, a node (e.g., 104A, 106A, etc.) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, database services, electronic communication services, data protection services, etc.) to one or more entities (e.g., users, components of the system (100), etc.), (iv) exchanging data with other components registered in/to the network (130) in order to, for example, participate in a collaborative workload placement, and/or (v) operating as a standalone device. In one or more embodiments, in order to read, write, or store data, a node (e.g., 104A, 106A, etc.) may communicate with, for example, clients (e.g., 120A, 120N), other nodes (e.g., 104N, 106N, etc.), and/or other entities/components (e.g., a backup storage system, a persistent volume pool, etc.).

Further, while a single node is considered above, the term "system" includes any collection of systems or sub-systems that individually or jointly execute a set, or multiple sets, of instructions to provide one or more computer-implemented services. For example, a single node may provide a computer-implemented service on its own (i.e., independently) while multiple other nodes may provide a second computer-implemented service cooperatively (e.g., each of the multiple other nodes may provide similar and/or different services that form the cooperatively provided service).

In one or more embodiments, the instructions may embody one or more of the methods or logic, including the methods discussed below in FIG. 3. In a particular embodiment, the instructions may reside completely, or at least partially, within a storage/memory resource (of, for example, a master node or a worker node (or a pod of a worker node)), and/or within a processor (of, for example, a master node or worker node) during execution by the worker node (e.g., 106A, 106B, etc.) or the master node (e.g., 104A, 104N, etc.).

To provide any quantity and any type of computer-implemented services, a node (e.g., 104A, 106A, etc.) may utilize computing resources provided by various hardware components and/or logical components (e.g., virtualization resources). In one or more embodiments, a computing resource (e.g., a measurable quantity of a compute-relevant resource type that may be requested, allocated, and/or consumed) may be (or may include), for example (but not limited to): a central processing unit (CPU), a graphics processing unit (GPU), a data processing unit (DPU), a memory resource, a network resource, storage space/source (e.g., to store any type and quantity of information), storage I/O, a hardware resource set, a compute resource set (e.g., one or more processors, processor dedicated memory, etc.), a control resource set, etc. In one or more embodiments, computing resources of a node (e.g., 104A, 106A, etc.) may be divided into three logical resource sets: a compute resource set, a control resource set, and a hardware resource set. Different resource sets, or portions thereof, from the same or different nodes may be aggregated (e.g., caused to operate as a computing device) to instantiate, for example, a composed node having at least one resource set from each set of the three resource set model.

In one or more embodiments, a CPU may refer to an electronic circuitry that may execute operations and/or instructions (i.e., computer-readable program code and/or machine byte-code) specified by an application. More specifically, a CPU may perform an operation in three steps: (i) fetching instructions related to the operation from memory, (ii) analyzing the fetched instructions, and (iii) performing the operation based on the analysis. In one or more embodiments, the operation may be, for example (but not limited to): a basic arithmetic calculation, comparing numbers, performing a function, displaying a video, etc.

In one or more embodiments, as a central processing virtualization platform, a virtual CPU (vCPU) implementation may be provided to one or more pods (e.g., 154A, FIG. 1.3), in which the vCPU implementation may enable the pods to have direct access to a single physical CPU. More specifically, the vCPU implementation may provide computing capabilities by sharing a single physical CPU among pods.

In one or more embodiments, a GPU may refer to an electronic circuitry that may provide parallel data processing capabilities to generate enhanced, real-time graphics and to perform accelerated computing tasks (which is particularly useful for machine learning (ML) related operations). In one or more embodiments, a GPU may include, for example (but not limited to): a graphics memory controller, a video processing engine (that is configured to or capable of rendering frames at a particular frame rate (and in some cases, configured to or capable of encoding frames at a particular frame rate)), a graphics and computation engine, etc.

In one or more embodiments, as a graphics virtualization platform, a virtual GPU (vGPU) implementation may be provided to one or more pods (e.g., 154A, FIG. 1.3), in which the vGPU implementation may enable the pods to have direct access to a single physical GPU. More specifically, the vGPU implementation may provide parallel data processing and accelerated computing capabilities by sharing a single physical GPU among pods.

In one or more embodiments, a DPU may refer to an electronic circuitry that may perform accelerated data processing and optimized data movement within the cluster (102). In one or more embodiments, a DPU may include, for example (but not limited to): a high-speed networking interface (e.g., 200 gigabits per second (200 Gb/s)), dynamic RAM (DRAM), multi-core (e.g., 8-core) CPU, programmable acceleration engines (particularly for ML, security, and telecommunications purposes), etc.

In one or more embodiments, as a data processing virtualization platform, a virtual DPU (vDPU) implementation may be provided to one or more pods (e.g., 154A, FIG. 1.3), in which the vDPU implementation may enable the pods to have direct access to a single physical DPU. More specifically, the vDPU implementation may provide full data center-on-chip programmability, and high-performance networking and computing capabilities by sharing a single physical DPU among pods.

Figure 5:
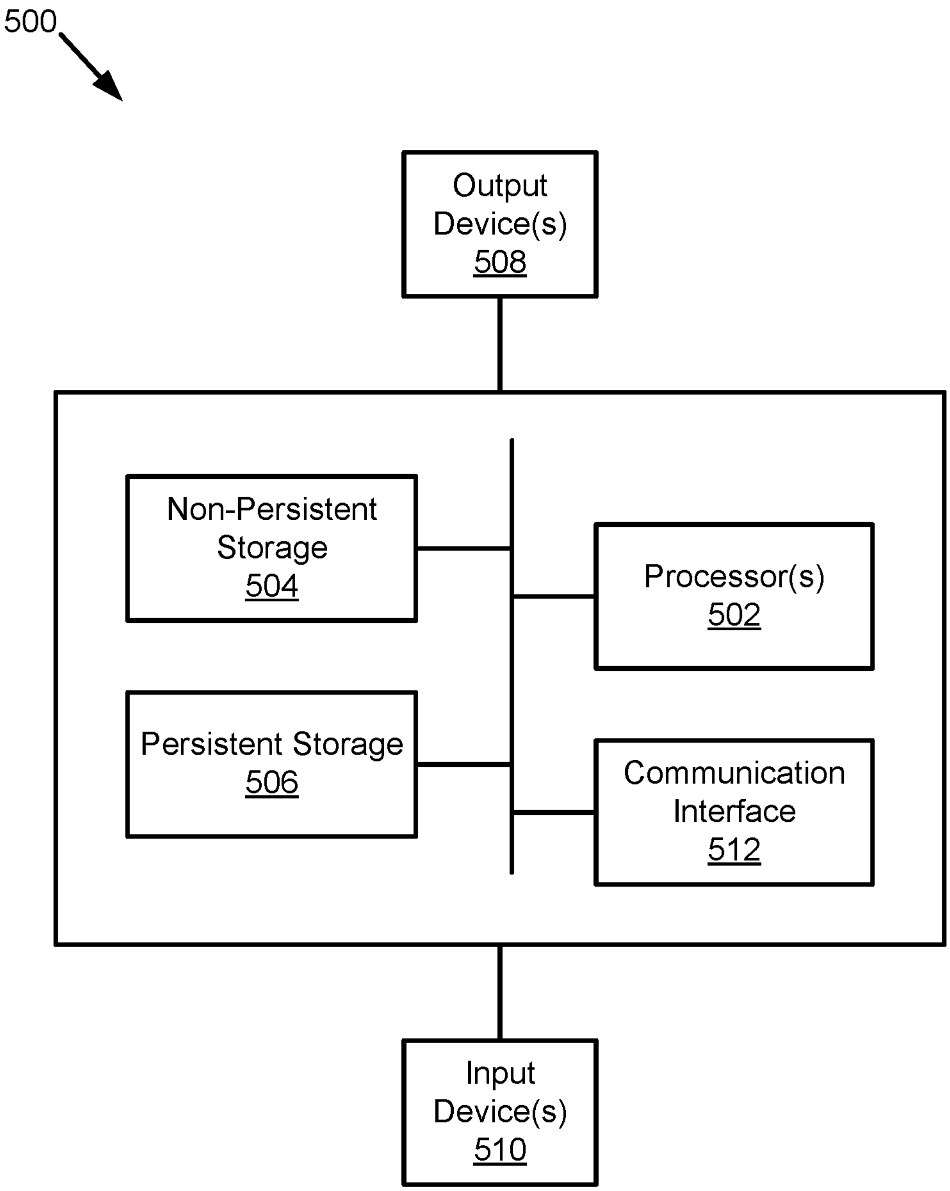
FIG. 5 shows a diagram of a computing device in accordance with one or more embodiments of the invention.

In one or more embodiments, a memory resource may be any hardware component that is used to store data in a computing device (e.g., 500, FIG. 5). The data stored in a memory resource may be accessed almost instantly (e.g., in milliseconds (ms)) regardless of where the data is stored in the memory resource. In most cases, a memory resource may provide the aforementioned instant data access because the memory resource may be directly connected to a CPU on a wide and fast bus connection (e.g., a high-speed internal connection that transfers data between the hardware components of a computing device).

In one or more embodiments, a memory resource may be (or may include), for example (but not limited to): DRAM (e.g., DDR4 DRAM, error correcting code (ECC) DRAM, etc.), persistent memory (PMEM) (e.g., (i) physical computer memory, for data storage, that includes both storage and memory attributes; (ii) byte-addressable like memory that is capable of providing byte-level access of data to applications and/or other logical components; etc.), Flash memory, etc. In one or more embodiments, DRAM may be volatile, which may mean DRAM only stores data as long as it is being supplied with power. Additionally, PMEM and Flash memory may be non-volatile, in which they may store data even after a power supply is removed.

In one or more embodiments, a network resource (or simply "network") may refer to (i) a computer network including two or more computers that are connected any combination of wired and/or wireless connections and/or (ii) for example, a network interface card (NIC) and a network adapter, which may be may be specified in base units of bits per second (bps). The computer network may be generated using hardware components (e.g., routers, access points, cables, switches, etc.) and software components (e.g., OSs, business applications, etc.). In one or more embodiments, geographic location may define a computer network. For example, a local area network (LAN) may connect computing devices in a defined physical space (e.g., in an office building), whereas a wide area network (WAN) (e.g., Internet) may connect computing devices across continents. In one or more embodiments, the computer network may be defined based on network protocols (e.g., TCP, UDP, IPv4, etc.).

In one or more embodiments, storage space (or simply "storage") may refer to a hardware component that is used to store data in a computing device (e.g., 500, FIG. 5). In one or more embodiments, storage may be a physical computer-readable medium. For example, storage may be (or may include) HDDs, Flash-based storage devices (e.g., solid-state drives (SSDs)), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). Storage may be other types of storage not listed above without departing from the scope of the invention.

In one or more embodiments, storage may be configured as a storage array (e.g., a NAS), in which the storage array may refer to a collection of one or more physical storage devices that may consolidate various forms of data. Each physical storage device may include non-transitory computer readable storage media, in which data may be stored in whole or in part, and temporarily or permanently.

In one or more embodiments, a hardware resource set (e.g., of a node) may include (or specify), for example (but not limited to): a configurable CPU option (e.g., a valid/legitimate vCPU count per-pod option), a configurable network resource option (e.g., enabling/disabling single-root input/output virtualization (SR-IOV) for specific pods), a configurable memory option (e.g., maximum and minimum memory per-pod), a configurable GPU option (e.g., allowable scheduling policy and/or vGPU count combinations per-pod), a configurable DPU option (e.g., legitimacy of disabling inter-integrated circuit (I2C) for various pods), a configurable storage space option (e.g., a list of disk cloning technologies across all pods), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory resource related template (e.g., a 4 GB DRAM template, an 8 GB DRAM template, etc.), a vCPU count per-pod, a virtual NIC (vNIC) count per-pod, a wake on LAN support configuration (e.g., supported/enabled, not supported/disabled, etc.), a swap space configuration per-pod, a vGPU count per-pod, a type of a vGPU scheduling policy (e.g., a "fixed share" vGPU scheduling policy, an "equal share" vGPU scheduling policy, etc.), a type of a GPU virtualization approach, a storage mode configuration (e.g., an enabled high-performance storage array mode, a disabled high-performance storage array mode, etc.), a file system block size, a backup frequency (e.g., hourly, daily, monthly, etc.), etc.

In one or more embodiments, a control resource set (e.g., of a node) may facilitate formation of, for example, a composed node within the cluster (102). To do so, a control resource set may prepare any quantity of computing resources from any number of hardware resource sets (e.g., of the corresponding node and/or other nodes) for presentation. Once prepared, the control resource set may present the prepared computing resources as bare metal resources to a composer (not shown) of a master node (e.g., 104A). By doing so, a composed node may be instantiated.

To prepare the computing resources of the hardware resource sets for presentation, the control resource set may employ, for example, virtualization, indirection, abstraction, and/or emulation. These management functionalities may be transparent to applications hosted by the instantiated/composed node. Consequently, while unknown to components of a composed node, the composed node may operate in accordance with any number of management models thereby providing for unified control and management of the composed node.

In one or more embodiments, the composer may implement a management model to manage computing resources (e.g., computing resources provided by one or more hardware/software devices of worker nodes (e.g., 106A, 106B, etc.)) in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the invention.

In one or more embodiments, in conjunction with the composer, a system control processor (not shown) of a corresponding worker node may cooperatively enable hardware resource sets of other worker nodes to be prepared and presented as bare metal resources to a composed "worker" node. In one or more embodiments, a compute resource set, a control resource set, and/or a hardware resource set may be implemented as separate physical devices. In such a scenario, any of these resource sets may include NICs or other devices to enable the hardware devices of the respective resource sets to communicate with each other.

One of ordinary skill will appreciate that the composer may perform other functionalities without departing from the scope of the invention. The composer may be implemented using hardware (i.e., circuitry), software, or any combination thereof.

In one or more embodiments, a node (e.g., 104A, 106A, etc.) may split up a request (e.g., an operation, a task, an activity, etc.) with another component of the system (100), coordinating its efforts to complete the request more efficiently than if the node had been responsible for completing the request. A request may be, for example (but not limited to): a web browser search request, a representational state transfer (REST) request, a computing request, a database management request, a registration request, a file upload/download request, etc. To provide computer-implemented services to one or more entities, a node may perform computations locally and/or remotely. By doing so, the node may utilize different computing devices (e.g., 500, FIG. 5) that have different quantities of computing resources to provide a consistent experience to the entities. In one or more embodiments, a node may be a heterogeneous set, including different types of hardware components and/or different types of OSs.

In one or more embodiments, a node (e.g., 104A, 106A, etc.) may host any number of applications (and/or content accessible through the applications) that provide application services to the clients (e.g., 120A, 120B, etc.). Application services may include, for example (but not limited to): instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in a node (e.g., 104A, 106A, etc.). In one or more embodiments, applications may be logical entities executed using computing resources of a node. For example, applications may be implemented as computer instructions, e.g., computer code, stored on persistent storage of a node that when executed by the processor(s) of the node, cause the node to provide the functionality of the applications described throughout the application.

In one or more embodiments, while performing, for example, one or more operations requested by a user of a client (e.g., 120A, 120B, etc.), applications installed on a node (e.g., 104A, 106A, etc.) may include functionality to request and use resources (e.g., data, metadata, computing resources, etc.) of the node. Applications may also perform other types of functionalities not listed above without departing from the scope of the invention. In one or more embodiments, while providing application services to a user, applications may store (temporarily or permanently) data that may be relevant to the user in persistent storage of the node.

In one or more embodiments, in order to provide the above-mentioned functionalities, a node (e.g., 104A, 106A, etc.) may need to communicate with other components of the system (100) with minimum amount of latency (e.g., with high-throughput (e.g., a high data transfer rate) and sub-ms latency). For this reason, REST application programming interfaces (REST APIs) may be used to enable communication(s) between the node and other components.

As discussed above, a node (e.g., 104A, 106A, etc.) may provide any quantity and type of computer-implemented services (e.g., to a user upon request). To provide the computer-implemented services, resources of the node (discussed above) may be used to instantiate a composed node (within the cluster (102)). The composed node may also provide any quantity and type of computer-implemented services (e.g., to a user upon request).

While a node (e.g., 104A, 106A, etc.) has been illustrated and described as including a limited number of specific components and/or hardware resources, the node may include additional, fewer, and/or different components without departing from the scope of the invention. One of ordinary skill will appreciate that a node (e.g., 104A, 106A, etc.) may perform other functionalities without departing from the scope of the invention.

In one or more embodiments, a node (e.g., 104A, 106A, etc.) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the node described throughout this application.

Alternatively, in one or more embodiments, the node (e.g., 104A, 106A, etc.) may be implemented as a logical device. The logical device may utilize the computing resources of any number of computing devices to provide the functionality of the node described throughout this application.

In one or more embodiments, one or more worker nodes (e.g., 106A, 106B, etc.) may be connected to a container registry (not shown). A container registry may represent a storage service dedicated to consolidating container images (of a container (e.g., 156A, 158A, etc., FIG. 1.3)). A container image may represent a foundation snapshot (e.g., a template), for a given workload or application type, from which deployed workloads, sought to be implemented, may be based. For example, should a data backup workload be deployed onto the cluster (102), an existing data backup container image may be retrieved from the container registry and used as a template for implementing a containerized environment (i.e., a container) where a data backup application may execute.

Accordingly, a container image may include all that which may be necessary to implement any given workload, such as relevant code and dependencies (e.g., system tools, system libraries, settings, etc.). Further, the container registry may be implemented on one or more servers (not shown). Each server may be a physical server (i.e., residing within a data center) or a virtual server (i.e., residing in a cloud-computing environment). Additionally or alternatively, the container registry may be implemented on one or more other computing devices/systems similar to the exemplary computing device shown in FIG. 5.

In one or more embodiments, a client (e.g., 120A, 120B, etc.) may include functionality to, e.g.: (i) capture sensory input (e.g., sensor data) in the form of text, audio, video, touch or motion, (ii) collect massive amounts of data at the edge of an Internet of things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the cluster (102)), store, or otherwise utilize captured sensor data (and/or any other type and/or quantity of data), and/or (iv) provide surveillance services (e.g., determining object-level information, performing face recognition, etc.) for scenes (e.g., a physical region of space).

In one or more embodiments, a client (e.g., 120A, 120B, etc.) may be a physical or logical computing device configured for hosting one or more workloads, or for providing a computing environment whereon workloads may be implemented. The client may provide computing environments that are configured for, at least: (i) workload placement collaboration, (ii) computing resource (e.g., processing, storage/memory, virtualization, networking, etc.) exchange, and/or (iii) protecting workloads (including their applications and application data) of any size and scale (based on, for example, one or more SLAs configured by users of the client).

In one or more embodiments, a client (e.g., 120A, 120B, etc.) may include any number of applications (and/or content accessible through the applications) that provide computer-implemented application services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

In one or more embodiments, while performing, for example, one or more operations requested by a user, applications installed on a client (e.g., 120A, 120B, etc.) may include functionality to request and use physical and logical resources of the client. Applications may also include functionality to use data stored in storage/memory resources of the client. The applications may perform other types of functionalities not listed above without departing from the scope of the invention. While providing application services to a user, applications may store data that may be relevant to the user in storage/memory resources of the client.

As being a physical or logical computing device, a client (e.g., 120A, 120B, etc.) may oversee cluster (102) operations and issue workload requests or other communications (which are actually initiated by users). To this end, to provide services to the users, a client may utilize, rely on, or otherwise cooperate with the cluster (102) (e.g., by interfacing with a master node (e.g., 104A) via the master node interface (e.g., 146, FIG. 1.2)). For example, a client may issue a request (e.g., a request to configure the cluster (102) via a master node (e.g., 104A), a workload request to implement user-defined workloads on the cluster (102) via the master node, etc.) to the cluster (102) to receive responses and interact with various components of the cluster. A client (e.g., 120A, 120B, etc.) may also request data from and/or send data to the cluster (102) (for example, a client may transmit information to a master node (e.g., 104A) that allows the master node to perform computations, the results of which are used by the clients to provide services to the users).

As yet another example, a client (e.g., 120A, 120B, etc.) may utilize application services provided by a master node (e.g., 104A). When the client interacts with the master node, data that is relevant to the clients may be stored (temporarily or permanently) in a database (e.g., etcd) of the master node. When a new user is identified, the database may add information of the new user to the database. By doing so, data that is relevant to clients may be stored in the database. This may be done because clients may desire access to the information of the new user at a later point-in-time.

In one or more embodiments, a client (e.g., 120A, 120B, etc.) may be capable of, e.g.: (i) collecting users' inputs, (ii) correlating collected users' inputs to the computer-implemented services to be provided to the users, (iii) communicating with the cluster (102) that performs computations necessary to provide the computer-implemented services, (iv) using the computations performed by the cluster to provide the computer-implemented services in a manner that appears (to the users) to be performed locally to the users, and/or (v) communicating with any virtual desktop (VD) in a virtual desktop infrastructure (VDI) environment (or a virtualized architecture) provided by the cluster (using any known protocol in the art), for example, to exchange remote desktop traffic or any other regular protocol traffic (so that, once authenticated, users may remotely access independent VDs). One of ordinary skill will appreciate that a client may perform other functionalities without departing from the scope of the invention.

In one or more embodiment, a VDI environment (or a virtualized architecture) may be employed for numerous reasons, for example (but not limited to): to manage resource (or computing resource) utilization, to provide cost-effective scalability across multiple servers, to provide a workload portability across multiple servers, to streamline an application development by certifying to a common virtual interface rather than multiple implementations of physical hardware, to encapsulate complex configurations into a file that is easily replicated and provisioned, etc.

As described above, a client (e.g., 120A, 120B, etc.) may provide computer-implemented services to users (and/or other computing devices). A client may provide any number and any type of computer-implemented services. To provide computer-implemented services, a client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a GPU, a DPU, a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), PMEM, virtualized storage, virtualized memory, etc.

In one or more embodiments, while a client (e.g., 120A, 120B, etc.) may provide computer-implemented services to users, the client may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the client may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC, a network adapter, a network processor, etc.

In one or more embodiments, a networking resource may provide capabilities to interface a client with external entities (e.g., the cluster (102)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., the TCP, the UDP, Remote Direct Memory Access (RDMA), IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 120A, 120B, etc.). For example, when utilizing RDMA to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a vCPU, a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 120A, 120B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 120A, 120B, etc.) may be implemented as a computing device (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, similar to a node (e.g., 104A, 106A, etc.), a client (e.g., 120A, 120B, etc.) may also be implemented as a logical device.

In one or more embodiments, users may interact with (or operate) clients (e.g., 120A, 120B, etc.) in order to perform work-related tasks (e.g., production workloads). In one or more embodiments, accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read, view, parse, interact with, etc.) the listed information.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the cluster, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (130) may enable interactions between, for example, the clients and the cluster through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

While FIG. 1.1 shows a configuration of components, other system configurations may be used without departing from the scope of the invention.

Turning now to FIG. 1.2, FIG. 1.2 shows a diagram of a master node (e.g., 104A) and a portion of the system (e.g., 100, FIG. 1.1) (from a different perspective) in accordance with one or more embodiments of the invention. The master node (104A) includes the composer (not shown), a master node interface (146), a master node manager (142), a cluster configuration repository (140), a certificate manager (144), a certificate operator (148), and a root certificate manager (138). The master node (104A) may include additional, fewer, and/or different components without departing from the scope of the invention. Each component may be operably connected to any of the other component via any combination of wired and/or wireless connections. Each component illustrated in FIG. 1.2 is discussed below.

In one or more embodiments, the master node manager (142) (or the control plane) may include functionality to, e.g.: (i) be dedicated to the management of the cluster (e.g., 102, FIG. 1.1); (ii) receive a request (e.g., an intention request, a workload/job request, a volume generation request, etc.) from a user via a client (e.g., receiving a request to execute a certain application or functionality on a bare metal system or on a composed worker node (e.g., 106A)) via the master node interface (146); (iii) analyze an intention specified in a request received from a user, for example, (a) to decide where (e.g., which worker node) to deploy one or more workloads and/or (b) to generate one or more persistent volumes; (iv) perform analytics pertinent to the cluster (e.g., 102, FIG. 1.1); (v) be responsible for the management of one or more pods (e.g., 154A, 154B, etc., FIG. 1.3) deployed to one or more worker nodes (e.g., 106A, 106B, etc.) (including management of policy actions on a worker node); (vi) be dedicated to binding (or assigning) workloads, sought to be implemented, to one or more worker nodes; (vii) deploy one or more workloads to an appropriate worker node based on (a) available computing resources (e.g., computing, memory, storage, virtualization, etc.) of the worker node and/or (b) one or more workload requirements (obtained from the cluster configuration repository (140)); (viii) monitor the availability of computing resources on each of the worker nodes; (ix) notify a user (via the master node interface (146) and a GUI of the corresponding client) with respect to a determined workload-to-worker node assignment; (x) generate/manage/monitor one or more services (Kubernetes services) (e.g., 210, 212, etc., FIG. 2) and/or pods (including lifecycle of applications being executed on the pods); (xi) perform scheduling and/or orchestration of one or more pods/containers; (xii) perform load balancing and autoscaling when, for example, CPU utilization of a container reaches a certain level, the master node manager may keep adding new replicas of the container until the utilization falls behind a predetermined threshold (e.g., to accommodate the demand); (xiii) communicate with each worker node manager (e.g., 150, FIG. 1.3) across the cluster (e.g., 102, FIG. 1.1) to infer which container is healthy (or unhealthy); (xiv) allocate IP (e.g., IPv4, IPv6, etc.) addresses to pods and services; (xv) ensure that workloads are distributed evenly (across as many worker nodes as possible) and try to place replica pods on different worker nodes to maintain high availability for services; (xvi) at the deployment level, monitor pod deployments and replicas across the cluster (in particular, unavailable replicas, which may indicate a capacity problem); (xvii) at the container level, monitor computing resource usage per container (and readiness of each container); (xviii) schedule containers on different worker nodes based on workload and the available computing resources on each worker node; and/or (xix) store (temporarily or permanently) the aforementioned data and/or the output(s) of the above-discussed processes in storage of the master node (104A)).

In one or more embodiments, the master node manager (142) may further include functionality to, e.g.: (i) manage distribution or allocation of available computing resources (e.g., user subscriptions to available resources) against a particular pod on a worker node (e.g., 106A, 106B, etc.); (ii) obtain and track (periodically or on demand) resource utilization levels (or key performance metrics with respect to, for example, network latency, the number of open ports, OS vulnerability, network port open/close integrity, password policy, data protection/encryption, data privacy/confidentiality, data integrity, data availability, be able to identify and protect against anticipated and/or non-anticipated security threats/breaches, etc.) of pods across all worker nodes (by obtaining telemetry data and/or logs) to identify (a) which pod is a healthy pod (e.g., a pod that generates a response to a request) and (b) which pod is an unhealthy pod (e.g., a pod that does not generate a response to a request, an over-provisioned pod, a pod that is slowing down in terms of performance, a pod's resource utilization value is exceeding a predetermined maximum resource utilization value threshold, etc.); (iii) based on (ii), manage health of a pod (and the worker node that hosts the pod) by implementing a policy (e.g., to manage an aggregate workload across pods, to manage SLA and QoS compliance as well as load balancing, etc.); (iv) identify health (e.g., a current status) of a pod (and the worker node that hosts the pod) based on average, minimum, and maximum resource utilization values (of each pod); (v) provide identified health of a pod (and the worker node that hosts the pod) to other entities (e.g., administrators, users of the clients, etc.); (vi) automatically react and generate alerts (e.g., a predictive alert, a proactive alert, a technical alert, etc.) if one of the predetermined maximum resource utilization value thresholds (associated with a pod or a worker node) is exceeded; (vii) add/remove computing resources to a worker node so that pods execute on the worker node may provide computer-implemented services to the corresponding users; (viii) manage computing resources of worker nodes and/or other resources (e.g., external resources) to provide computer-implemented services (e.g., where one or more pods may be instantiated using the resources of the worker nodes, external resources, and/or other types of computing devices); (ix) provide worker node composition services for users of clients (e.g., 120A, 120B, etc.); (x) generate a configuration template; and/or (xi) store (temporarily or permanently) the aforementioned data and/or the output(s) of the above-discussed processes in the storage of the master node (104A)).

In one or more embodiments, a configuration template may include (or specify), for example (but not limited to): a first hardware resource set of a first worker node (e.g., 106A), a second hardware resource set of a second worker node (e.g., 106B), a third hardware resource set of an external resource, etc. In one or more embodiments, the first hardware resource set may include hardware resources that are distinct from a second hardware resource and/or a third hardware resource set.

In one or more embodiments, information (e.g., resource utilization levels, logs, SLA and QoS compliance data from each pod, load balancing between worker nodes, key performance metrics related to the worker nodes, etc.) may be obtained as they become available or by the master node manager (142) polling the corresponding worker node (e.g., by making an API call to a worker node manager (e.g., 150, FIG. 1.3) that is managing the corresponding worker node) for new information. Based on receiving the API call from the master node manager, the worker node manager may allow the master node manager to obtain the information. If necessary, the information may be shared with a user/administrator via a GUI of a corresponding client (e.g., 120A, 120B, etc.).

In one or more embodiments, the aforementioned information may be obtained (or streamed) continuously (without affecting production workloads of a corresponding worker node), as they are generated, or they may be obtained in batches, for example, in scenarios where (i) the master node manager (142) receives a failure score calculation request (e.g., a health check request), (ii) a corresponding worker node manager (e.g., 150, FIG. 1.3) accumulates the information and provides them to the master node manager at fixed time intervals, or (iii) the corresponding worker node manager stores the information in its storage (or in an external entity) and notifies the master node manager to access the information from its storage or from the external entity. In one or more embodiments, the information may be access-protected for the transmission from the worker node manager to the master node manager, e.g., using encryption.

As described above, the master node manager (142) may monitor service performance and resource utilization of a worker node (for, for example, troubleshooting and optimization) by obtaining/monitoring telemetry data about the worker node's computing resources from a corresponding worker node manager (e.g., 150, FIG. 1.3). In one example, the master node manager (142) may, e.g.: (i) monitor actions being performed, and computation power being consumed by each worker node, (ii) monitor communications being sent or received by each worker node by intercepting them, (iii) based on the intercepted communications, authenticate the communications and determine utilization rates of one or more resources by a worker node, and/or (iv) store (temporarily or permanently) the resource utilization rates (e.g., including estimates, measurements, etc.) in storage (of the master node (104A)).

In one or more embodiments, while monitoring, the master node manager (142) may need to, for example (but not limited to): inventory one or more components of each worker node, obtain a type and a model of a component of a worker node, obtain a version of firmware or other code executing on a worker node, obtain information regarding a hardware component or a software component of a worker node that may be allocated to a worker node, obtain information specifying each worker node's interaction with one another, etc.

In one or more embodiments, in order to manage the health of worker nodes (e.g., 106A, 106B, etc.) (in particular, the health of unhealthy worker nodes) and resolve bottlenecks without affecting the operation of the cluster (e.g., 102, FIG. 1.1), the master node manager (142) may take one or more preventive (and proactive) actions. A preventive action may be, for example (but not limited to): performing workload redistribution among worker nodes (e.g., high-performance load balancing) (for example, to prevent workload mismatch between worker nodes and to manage overall performance of the cluster), reducing the quantity of unnecessary REST API calls (for example, to prevent unnecessary memory utilization and to improve the likelihood that the unhealthy worker nodes are healthy again), modifying (e.g., adding, removing, etc.) resources allocated to a worker node (for example, to ensure highly available worker nodes and pods), modifying a predetermined maximum resource utilization value threshold (e.g., increasing a predetermined maximum CPU utilization value threshold from 70% to 85% so that Worker Node A may take more workloads), testing (in terms of resource utilization and workload assignment) a newer worker node that will be added into the cluster (e.g., 102, FIG. 1.1) before causing an impact on the cluster, etc.

Further, in one or more embodiments, the master node manager (142) may receive one or more composition requests (e.g., a worker node composition request) from one or more users. A composition request may indicate a desired outcome such as, for example, execution of one or more applications (or pods) on a worker node, providing of one or more services (e.g., by a pod), etc. The master node manager (142) may translate (using an intent based model) the composition request into corresponding quantities of computing resources necessary to be allocated (e.g., to a composed worker node) to satisfy a user's intent expressed in the composition request. Once the quantities of computing resources are obtained, the master node manager (142) may allocate computing resources of worker nodes (e.g., 106A, 106B, etc.) to meet the identified quantities of computing resources by instructing processors of the worker nodes to prepare and present resources (e.g., hardware resource sets) of the worker nodes to compute resource sets of the worker nodes.

For example, the master node manager (142) may utilize an outcome based computing resource requirements lookup table to match an expressed intent to resources to be allocated to satisfy that intent. The outcome based computing resource requirements lookup table may specify the type, make, quantity, method of management, and/or other information regarding any number of computing resources that when aggregated will be able to satisfy a corresponding intent. The master node manager may identify resources for allocation to satisfy composition requests via other methods without departing from the scope of the invention.

Additionally, the master node manager (142) may instruct the processors (of one or more worker nodes) to manage the hardware resources of the hardware resource sets in accordance with one or more models (e.g., data integrity, security, etc.). However, when the processors present these resources to the compute resource sets, the processors may present the resources as bare metal resources while managing them in more complex manners. By doing so, embodiments of the invention may provide a framework for unified security, manageability, resource management/composability, workload management, and distributed system management by use of processors.

As discussed above, computing resources of a worker node (e.g., 106A, 106B, etc.) may be divided into three logical resource sets (e.g., a compute resource set, a control resource set, and a hardware resource set). By logically dividing the computing resources of a worker node into these resource sets, different quantities and types of computing resources may be allocated to each worker node and/or a composed worker node. Further, dividing the computing resources in accordance with the three set model may enable different resource sets to be differentiated (e.g., given different personalities) to provide different functionalities. Consequently, worker nodes may be composed on the basis of desired functionalities rather than just on the basis of aggregate resources to be included in the composed worker nodes.

As discussed above, to instantiate a composed worker node, the worker nodes (e.g., 106A, 106B, etc.) may include at least three resource sets including a control resource set. The control resource set may include a processor, in which the corresponding processor of each worker node may coordinate with the master node manager (142) to enable a composed worker node to be instantiated. For example, a processor of a worker node may provide telemetry data regarding computing resources of the worker node, may perform actions on behalf of the master node manager to aggregate computing resources together, may organize the performance of duplicative workloads to improve the likelihood that workloads are completed, and/or may provide services that unify the operation of a composed worker node.

In one or more embodiments, a processor of a worker node (e.g., 106A) may mediate presentation of the computing resources provided by the hardware resources (of the worker node) to a computing resource set (e.g., as bare metal resources). When doing so, the processor may provide a layer of abstraction that enables the hardware resources to be, for example, virtualized, emulated as being compatible with other systems, and/or directly connected to the compute resource set (e.g., pass through). Consequently, computing resources of the hardware resources may be finely, or at a macro level, allocated to different composed worker nodes.

In one or more embodiments, composition requests may specify computing resource allocations using an intent based model (e.g., intent based requests received from users). For example, rather than specifying specific hardware resources/devices (or portions thereof) to be allocated to a particular compute resource set to obtain a composed worker node, a composition request may only specify that a composed worker node is to be instantiated having predetermined characteristics, that a composed worker node will perform certain workloads or execute certain applications, and/or that the composed worker node be able to perform one or more predetermined functionalities. In such a scenario, the master node manager (142) may decide how to instantiate a composed worker node (e.g., which resources to allocate, how to allocate the resources (e.g., virtualization, emulation, redundant workload performance, data integrity models to employ, etc.), etc.).

In one or more embodiments, composition requests may specify computing resource allocations using an explicit model. For example, a composition request may specify (i) computing resources to be allocated, (ii) the manner of presentation of those resources (e.g., emulating a particular type of device using a virtualized resource vs. path through directly to a hardware component), and/or (iii) compute resource set(s) to which each of the allocated resources are to be presented. In addition to specifying computing resource allocations, a composition request may also specify, for example, applications (or pods) to be hosted by a composed worker node, security models to be employed by the composed worker node, communication models to be employed by the composed worker node, services to be provided by the composed worker node, user/entity access credentials for use of the composed worker node, and/or other information usable to place the composed worker node into states where the composed worker node provides desired computer-implemented services.

Further, to cooperate with processors (of worker nodes), the master node manager (142) may obtain telemetry data regarding the computing resources of any number of worker nodes and/or external resources that are available for allocation. The master node manager may aggregate this data in a telemetry data map that may be subsequently used to identify resources of any number of worker nodes and/or external resources to satisfy composition requests (e.g., instantiate one or more worker nodes to meet the requirements of the composition requests).

As a composed worker node is instantiated, the master node manager (142) may add information reflecting resources allocated to the composed worker node, workloads being performed by the composed worker node, and/or other types of information to a composed infrastructure map. The master node manager may utilize this information to, for example, decide whether computing resources should be added to or removed from one or more worker nodes (e.g., 106A, 106B, etc.). Consequently, computing resources may be dynamically re-provisioned over to meet changing workloads imposed on the worker nodes.

One of ordinary skill will appreciate that the master node manager (142) may perform other functionalities without departing from the scope of the invention. The master node manager (142) may be implemented using hardware (e.g., an integrated circuit), software, or any combination thereof (e.g., a physical computing system).

As being a fault-tolerant database, etcd may store and/or manage critical data (e.g., configuration data, state data, metadata, etc.) that the cluster (e.g., 102, FIG. 1.1) needs to keep providing its functionalities. The etcd may store unstructured and/or structured data such as, for example, a telemetry data map, a composed infrastructure map, an infrastructure utilization map, a health status repository, and a composable asset map. These data structures may be maintained by, for example, the master node manager (142). For example, the master node manager may add, remove, and/or modify information included in these data structures to cause the information included in these data structures to reflect the state of any number of worker nodes, external resources, and/or composed worker nodes.

In one or more embodiments, the unstructured and/or structured data (or data structures) may include (or specify), for example (but not limited to): an identifier of a container image, a number of container replicas that needs to be executed per worker node, a number of worker nodes across the cluster (e.g., 102, FIG. 1.1), a number of pods across the cluster, a number of pods per worker node, network latency, logon time, a frame rate, a number of dropped packets, storage I/O latency, end-to-end user latency, a minimum user count supported by a worker node, a maximum user count supported by a worker node, a maximum network latency threshold that needs to be met by a worker node, a maximum dropped packets threshold that needs to be met by a worker node, a maximum storage I/O latency threshold that needs to be met by a worker node, a maximum end-to-end I/O user latency threshold that needs to be met by a worker node, a rule to provide an always-access guarantee to computing resources (e.g., especially to certain resources when contention over subscription occurs) for a user/tenant with a user access level/tier of 9/10, etc.

Any of these data structures may be implemented using any combination and quantity of, for example, lists, tables, unstructured data, databases, etc. While illustrated as being stored locally, any of these data structures may be stored remotely and may be distributed across any number of devices without departing from the invention. Further, while the etcd has been illustrated and described as including a limited number and type of data, the etcd may store additional, less, and/or different data without departing from the scope of the invention.

In one or more embodiments, the cluster configuration repository (140) may represent a data store dedicated to consolidation of cluster (e.g., 102, FIG. 1.1) configuration information. Cluster configuration information may refer to data that details the state of the cluster at any given point of time. By way of example, cluster configuration information may include (but not limited to): information identifying one or more worker nodes that, at least in part, establish the cluster, information identifying various workloads implemented and/or containers executing across the cluster, and/or information identifying which worker nodes may be hosting which workload(s) and/or container(s).

Further, the cluster configuration repository (140) may store data structures including, for example (but not limited to): composed system data, a resource map, a computing resource health data, a request ruleset, a response ruleset, etc. In one or more embodiments, the composed system data may be implemented using one or more data structures that includes information regarding composed worker nodes. For example, the composed system data may specify identifiers of composed worker nodes and resources that have been allocated to the composed worker nodes.

The composed system data may also include information regarding the operation of the composed worker nodes. The information (which may be utilized to manage the operation of the composed worker nodes) may include (or specify), for example (but not limited to): workload performance data, resource utilization rates over time, management models employed by the master node manager (142), etc. For example, the composed system data may specify information regarding duplicative data stored for data integrity purposes, redundantly performed workloads to meet high-availability service requirements, encryption schemes utilized to prevent unauthorized access of data, etc.

In one or more embodiments, a request ruleset may specify (or include), for example (but not limited to): a request (e.g., received from a user) decryption rule, a request authentication rule (which may be utilized by the master node manager (142) to validate a request), a type of an allowable network communication/protocol between an entity and components of the cluster (e.g., 102, FIG. 1.1), a particular header that needs to be included in an intercepted request, a smart contract that defines under what conditions a request should be granted, a smart contract that defines under what conditions data a request should be transferred to a worker node, one or more rules/policies for detecting and blocking illegitimate requests and application-based attacks, one or more rules/policies to protect components of the cluster against various classes and types of Internet-based vulnerabilities, etc.

In one or more embodiments, a response ruleset may include (or specify), for example (but not limited to): an attribution rule (e.g., a type/format of an asset (e.g., a ".pdf" file, a ".doc" file, a "jpeg" file, etc.), a size of an asset, a content of an asset (e.g., a legal document, an engineering design document, etc.), an identifier of an asset, etc.), an asset sensitivity/criticality threshold that needs to be applied for all outgoing network traffic, etc. In one or more embodiments, the authentication related rules included in the response ruleset and request ruleset may be the same across all clusters of an organization to perform a uniform and successful authentication process.

In one or more embodiments, the resource map may include information regarding resources of worker nodes (e.g., 106A, 106B, etc.). For example, the resource map may specify the type and/or quantity of computing resources available for allocation and/or that are already allocated to a composed worker node. The resource map may be used to provide data to management entities, such as administrators.

In one or more embodiments, the computing resource health data may include information regarding the health of hardware devices that provide computing resources to composed worker nodes. For example, the computing resource health data may specify operation errors, health state information, temperature, and/or other types of information indicative of the health of hardware devices.

The computing resource health data may specify the health states of hardware devices via any method. For example, the computing resource health data may indicate whether, based on the aggregated health information, that the hardware devices are or are not in compromised states. A compromised health state may indicate that the corresponding hardware device has already or is likely to, in the future, be no longer able to provide the computing resources that it has previously provided.

The health state determination may be made via any method based on the aggregated health information without departing from the scope of the invention. For example, the health state determination may be made based on heuristic information regarding previously observed relationships between health information and future outcomes (e.g., current health information being predictive of whether a hardware device will be likely to provide computing resources in the future).

The aforementioned data structures may be maintained by, for example, the master node manager (142). For example, the master node manager may add, remove, and/or modify information included in the data structures to cause the information included in the data structures to reflect the state of the composed worker nodes. The data structures may be implemented using, for example, lists, tables, unstructured data, databases, etc. While illustrated as being stored locally, the data structures may be stored remotely and may be distributed across any number of devices without departing from the scope of the invention.

While the cluster configuration repository (140) has been illustrated and described as including a limited number and type of data, the cluster configuration repository (140) may store additional, less, and/or different data without departing from the scope of the invention.

One of ordinary skill will appreciate that the cluster configuration repository (140) may perform other functionalities without departing from the scope of the invention. The cluster configuration repository (140) may be implemented using one or more physical storage devices and/or media representative of data storage on the master node (104A). These one or more physical storage devices and/or media may or may not be of the same type. In one or more embodiments, the cluster configuration repository (140) may be implemented using persistent (i.e., non-volatile) data storage. Examples of persistent data storage include (but not limited to): optical storage, magnetic storage, NAND Flash memory, NOR Flash memory, MRAM), ST-MRAM, PCM, etc.

In one or more embodiments, the certificate manager (144) may be a manager that is dedicated to the authentication of communications across the cluster (e.g., 102, FIG. 1.1) using certificates. To that extent, the certificate manager (144) may perform the following functionalities (but not limited to): (i) generating cluster certificates using a root certificate, cluster identity parameters, etc., (ii) mapping cluster certificates to users, clients, pods, containers, worker nodes (e.g., 106A, 106N), etc., (iii) obtaining cluster identity parameters and imported certificates from the certificate operator (148) and/or the master node manager (142), (iv) authenticating communications to and throughout the cluster (102) using the cluster certificates and/or import certificates, etc.

One of ordinary skill will appreciate that the certificate manager (144) may perform other functionalities without departing from the scope of the invention. For additional information regarding the functionality of the certificate manager (144) refer to FIG. 3. The certificate manager (144) may be implemented using hardware, software, or any combination thereof.

In one or more embodiments, the master node interface (146) may represent an application programming interface (API) (e.g., a communication channel, an entry point to the cluster, etc.) for the cluster (e.g., 102, FIG. 1.1). To that extent, the master node interface (146) may employ a set of subroutine definitions, protocols, and/or hardware/software components for enabling communications between the cluster and external entities (e.g., the clients (e.g., 120A, 120B, etc.)). The master node interface (146) may also facilitate communications between the master node (104A) and one or more worker nodes (e.g., 106A, 106B, etc.).

In one or more embodiments, the master node interface (146) may perform the following additional functionalities (but not limited to): maintaining and/or updating the cluster configuration repository (140), invoking the master node manager (142), deploying (in conjunction with the master node manager) workloads to one or more worker nodes (e.g., 106A, 106N, etc.), receiving and validating (in conjunction with the master node manager and the certificate manager) workload requests from external entities, etc.

One of ordinary skill will appreciate that the master node interface (146) may perform other functionalities without departing from the scope of the invention. The master node interface (146) may be implemented using hardware, software, or any combination thereof.

In one or more embodiments, the certificate operator (148) may be an operator that is dedicated to the management and update of cluster certificates and import certificates in the cluster (102). To that extent, the certificate operator (148) may perform the following functionalities (but not limited to): (i) monitoring and identifying changes in the cluster (102) (e.g., in conjunction with the master node manager), (ii) generating updated cluster identity parameters based on changes to the cluster (102), (iii) updating cluster certificates based on the updated cluster identity parameters (e.g., in conjunction with the certificate manager (144)), (iv) obtaining imported certificates from clients (e.g., 120A, 120N) in conjunction with the master node interface (146), (v) replacing cluster certificates with imported certificates in conjunction with the certificate manager (144), etc.

One of ordinary skill will appreciate that the certificate operator (148) may perform other functionalities without departing from the scope of the invention. For additional information regarding the functionality of the certificate operator (148) refer to FIG. 3. The certificate operator (148) may be implemented using hardware, software, or any combination thereof. In one or more embodiments disclosed herein, the certificate operator (148) may be a component of any node in the cluster (102) without departing from embodiments disclosed herein.

In one or more embodiments, the root certificate manager (138) may be a manager that is dedicated to the management of one or more root certificates for the cluster (102). To that extent, the root certificate manager (138) may perform the following functionalities (but not limited to): (i) generating, obtaining, and/or updating root certificates using a certificate authority (CA), (ii) generating, obtaining, and/or storing root CA keys (e.g., public keys and/or private keys), (iii) securing access to the root certificate, root CA keys, and/or the root certificate authority, etc.

One of ordinary skill will appreciate that the root certificate manager (138) may perform other functionalities without departing from the scope of the invention. The certificate manager (144) may be implemented using hardware, software, or any combination thereof.

While the master node (104A) has been illustrated and described as including a limited number of specific components, the master node (104A) may include additional, fewer, and/or different components than those mentioned above without departing from the scope of the invention. In one or more embodiments, the cluster (e.g., 102, FIG. 1.1) may host multiple master nodes, making a master node highly available; that is, if any master node fails or is shut down (which may directly affect applications/pods being executed on one or more worker nodes), or one of components of a master node fails, the cluster will still work properly.

In one or more embodiments, the master node manager (142), the cluster configuration repository (140), the certificate manager (144), the master node interface (146), the certificate operator (148), and the root certificate manager (138) may be utilized in isolation and/or in combination to provide the above-discussed functionalities. These functionalities may be invoked using any communication model including, for example, message passing, state sharing, memory sharing, etc. By doing so, the master node (104A) may address issues related to data security, integrity, and availability proactively.

Further, some of the above-discussed functionalities may be performed using available resources or when resources of the nodes are not otherwise being consumed. By performing these functionalities when resources are available, these functionalities may not be burdensome on the resources of the nodes and may not interfere with more primary workloads performed by the nodes.

While FIG. 1.2 shows a configuration of components, other system configurations may be used without departing from the scope of the invention.

Turning now to FIG. 1.3, FIG. 1.3 shows a diagram of a worker node (e.g., 106A) and a portion of the system (e.g., 100, FIG. 1.1) (from a different perspective) in accordance with one or more embodiments of the invention. The worker node (106A) includes a worker node manager (150) and a container runtime (152). The worker node (106A) may include additional, fewer, and/or different components without departing from the scope of the invention. Each component may be operably connected to any of the other component via any combination of wired and/or wireless connections. Each component illustrated in FIG. 1.3 is discussed below.

In one or more embodiments, the worker node (106A) may represent a physical computing device dedicated to the execution of workloads presented to the cluster (e.g., 102, FIG. 1.1) To that extent, the worker node (106A) may perform the following functionalities (but not limited to): receiving workloads deployed by the master node (104A), implementing received workloads using one or more containers (e.g., 156A, 158A, etc.), providing computing resources to support the execution of containers, monitoring and reporting container status(es), aggregating metrics and/or metadata pertinent to cluster analytics, obtaining, implementing, and/or responding to communications (e.g., requests) (in conjunction with the master node (e.g., 104A)), etc.

In one or more embodiments, the worker node manager (150) may include functionality to, e.g.: (i) interact with the master node (104A) (e.g., receiving workloads sought for implementation, reporting worker node pertinent state information, etc.); (ii) manage and/or invoke the container runtime (152) to implement received workloads (sought for implementation) and aggregate workload metadata; (iii) set the correct resource requests and limits for the containers (e.g., if the requests are too small, one or more pods (e.g., 154A, 154B, etc.) may start failing); (iv) periodically review resource requests and limits for various workloads and compare them against what was actually used; (v) manage (in conjunction with the master node manager (e.g., 142, FIG. 1.2)) a group of replicas of a particular pod to make sure there are always the specified number of replicas in the cluster; (vi) in conjunction with the master node manager, allow the generation, maintenance, scheduling, and/or configuration of one or more containers (e.g., 156A, 158A, etc.) by using computing resources assigned to the worker node (106A); (vii) in conjunction with the master node manager, keep track of one or more pods and assign an IP address to each pod and/or service; and/or (viii) store (temporarily or permanently) the aforementioned data and/or the output(s) of the above-discussed processes in storage.

One of ordinary skill will appreciate that the worker node manager (150) may perform other functionalities without departing from the scope of the invention. The worker node manager (150) may be implemented using hardware, software, or any combination thereof.

In one or more embodiments, the container runtime (152) may represent a computer program dedicated to the implementation of workloads (by hosting one or more pods (e.g., Pod A (154A), Pod B (154B), etc.)). To that extent, the container runtime (152) may perform the following functionalities (but not limited to): at the behest of the worker node manager (150), obtaining workloads sought for implementation therefrom; implementing obtained workloads through the lifecycle management of one or more pods; allocating worker node (106A) resources to support the implementation of obtained workloads; issuing container image requests to the container registry (discussed above in reference to FIG. 1.1) and receiving container images therefrom; reporting state information pertinent to one or more pods to the worker node manager; aggregating workload metadata for the worker node manager; executing one or more containers; etc. One of ordinary skill will appreciate that the container runtime (152) may perform other functionalities without departing from the scope of the invention.

In one or more embodiments, a pod (e.g., 154A, 154B, etc.) may refer to a logical collection of one or more containers (e.g., Container A1 (156A) hosted by Pod A (154A), Container A2 (158A) hosted by Pod N (154N), Container N1 (156N) hosted by Pod A (154A), Container N2 (158N) hosted by Pod N (154N), etc.) or the smallest unit in Kubernetes with shared storage, network resources, and a specification for how to execute the containers (e.g., a pod is an abstraction layer on top of one or more containers). Any given pod (e.g., 154A, 154N, etc.) may be directed to the execution of a given workload, and any given container (e.g., 156A, 158A, etc.) of the given pod may be directed to the execution of any subset of the required tasks (i.e., processes or instances) associated with the given workload (where any given container may have a short lifespan). Each pod (or other entities such as clients (e.g., 120A, 120N, FIG. 1.1), the master node (e.g., 104A), the worker node manager (150), etc.) may communicate with another pod using a cluster identity parameter. The cluster identity parameter may include a pod's "internal" IP address in an internal network of in the cluster (e.g., 102, FIG. 1.1), a pod's fully qualified domain name (FQDN) in a Domain Name System (DNS) associated with the cluster (e.g., 102, FIG. 1.1), and/or any other parameter (e.g., domain identifiers, node identifiers, etc.) that may be used to identity a pod in the cluster (e.g., 102, FIG. 1.1) without departing from embodiments disclosed herein.

In one or more embodiments, a pod set (or "pods") may refer to a logical collection of one or more pods (e.g., 154A, 154B, etc.), which may enact the implementation and completion of a given workload. That is, when a given workload is implemented, one or more pods may be generated to perform and ensure the successful completion of the task(s) associated with the given workload.

The generated pod(s) (e.g., 154A, 154B, etc.) may either execute these task(s) as a non-parallel (i.e., serial) process or as multiple parallel processes. As a non-parallel process, any single pod (e.g., 154A, 154B, etc.) may be instantiated and execute these task(s) at any given time. When the instantiated pod (e.g., 154A, 154B, etc.) fails, for any number of reasons, a newer pod may be instantiated to continue execution of the task(s). Should this newer pod also fail, another new pod may be instantiated to take its place. This non-parallel processing of the task(s) continues until the task(s) associated with the given workload successfully complete.

On the other hand, as a parallel process, any set of two or more pods (e.g., 154A, 154B, etc.) may be instantiated and execute the above-mentioned task(s) at any given time. Successful completion of the task(s) may be defined through a different metric (e.g., a specified number of successful completions by an equal specified number of pods). Each successful completion of the task(s) may be tracked until the specified number of successful completions is reached, where at that point, the parallel processing of the task(s) officially complete and terminate. When any given pod (e.g., 154A, 154B, etc.) fails, one or more newer pods may be instantiated in place of the failed pod.

By way of a simplified example, a workload may be defined through three different tasks (or processes), e.g., a main process, which may handle the bulk of the workload, and two assistant processes, which may focus on the performance of minor responsibilities. In one embodiment, a first container (e.g., 156A) may be instantiated to execute the main process, while a second container (e.g., 156N) may be instantiated to execute the two assistant processes. In another embodiment, three separate containers may be instantiated to execute each different task (or process), respectively. Further, any given container (e.g., 156A, 158A, etc.), like any given pod (e.g., 154A, 154B, etc.), may fail for any number of reasons. When a failure transpires, a newer container may be instantiated to continue the subset of tasks (or processes) for which the failed container had been responsible.

In one or more embodiments, a pod (e.g., 154A, 154B, etc.) may not be aware of (i) local and/or remote nodes and/or pods in the cluster (e.g., 102, FIG. 1.1) and/or (ii) any other cluster-related information within another (local or remote) pod and/or node (so that users may move the cluster to another form factor at a later point-in-time and the pods may operate in a truly abstracted manner). Said another way, each of the pods that executes on the cluster is not required to have (or be aware of) any infrastructure knowledge (e.g., local/remote pod placements/deployments (on the same/different nodes), pod affinity mechanisms, local/remote node deployments, node affinity mechanisms, etc., across the cluster) about the cluster.

As used herein, a container may refer to a standalone, lightweight virtualization environment (e.g., an independent/isolated software instance that is packed up by services, along with libraries and dependencies) that allows for executing an application or an OS, within the container, without the overhead of executing a hypervisor (i.e., a computer program dedicated to the management of virtualization objects such as VMs) over the underlying hardware/software components of the container's host (e.g., 106A). In one or more embodiments, a container (e.g., 156A, 158A, etc.) may be executing in "user space" (e.g., a layer of software that utilizes low-level system components for the execution of one or more applications) of an OS of the worker node (106A). Further, a container may only be aware of a network interface with an IP address, a gateway, a routing table, one or more DNS services, and/or other networking details. Each of the containers may be performing similar or different processes at the same time.

While the worker node (106A) has been illustrated and described as including a limited number of specific components, the worker node (106A) may include additional, fewer, and/or different components than those mentioned above without departing from the scope of the invention. In one or more embodiments, the cluster (e.g., 102, FIG. 1.1) may host multiple worker nodes, making a worker node highly available; that is, if any worker node fails or is shut down (which may directly affect applications/pods being executed), or one of components of a worker node fails, the cluster will still work properly.

In one or more embodiments, the worker node manager (150) and the container runtime (152) may be utilized in isolation and/or in combination to provide the above-discussed functionalities. These functionalities may be invoked using any communication model including, for example, message passing, state sharing, memory sharing, etc. By doing so, the worker node (106A) may address issues related to data security, integrity, and availability proactively.

Further, some of the above-discussed functionalities may be performed using available resources or when resources of the nodes are not otherwise being consumed. By performing these functionalities when resources are available, these functionalities may not be burdensome on the resources of the nodes and may not interfere with more primary workloads performed by the nodes.

While FIG. 1.3 shows a configuration of components, other system configurations may be used without departing from the scope of the invention.

Turning now to FIG. 2, FIG. 2 shows a diagram of internal network traffic in a cluster in accordance with one or more embodiments of the invention. As indicated, (i) Worker Node A (202A) hosts multiple pods (e.g., Pod A1 (204A), Pod N1 (204N), etc.), (ii) Worker Node B (202B) hosts multiple pods (e.g., Pod A2 (206A), Pod N2 (206N), etc.), and (iii) Worker Node C (202C) hosts multiple pods (e.g., Pod A3 (208A), Pod N3 (208N), etc.). Further, each pod (e.g., Pod A1) is connected to Service A (210) and Service B (212) via wired and/or wireless connections. Each of Worker Node A-C may be an example of a worker node discussed above in reference to FIGS. 1.1 and 1.3.

As used herein, a "service" may refer to a method for exposing a network application that is executing as one or more pods (e.g., 204A, 204N, etc.) in the cluster (e.g., 102, FIG. 1.1). A service (e.g., 210, 212, etc.) may be generated by the master node manager (e.g., 142, FIG. 1.2) and include functionality to, e.g.: (i) make one or more pods available in an external network so that one or more clients may interact with the pods; (ii) with the help of a service API (e.g., an abstraction to help exposing a set of pods over an internal/external network, an ingress, etc.), define a set of network endpoints (e.g., pods) along with a network traffic policy about how to make the pods accessible; (iii) support different protocols (e.g., TCP, UDP, etc.) for communication and metadata/data transfer; (iv) support multiple port definitions (where each definition may have the same protocol or a different protocol); (v) publish a port and an IP address to a pod so that the pod may connect/access to the service using the port and IP address (when necessary); (vi) be a static/permanent IP address that can be attached to a pod; (vii) be independent from a lifecycle of a pod; and/or (viii) act as a proxy or a load balancer (e.g., the service may forward a request to a pod that is least busy), and forward requests to one or more pods (via a single and durable IP address or a FQDN).

As described above, each pod (e.g., 204A, 208A, etc.) may have a unique IP address and a range of ports (to allocate to its containers), in which the IP address is reachable from all other pods in the cluster (e.g., 102, FIG. 1.1) or other entities (e.g., clients, master node, etc. When a pod (e.g., 204A) is generated (by the master node manager (e.g., 142, FIG. 1.2)) on a worker node (e.g., 202A), the pod may get its own network namespace and a virtual Ethernet connection to connect to the underlying internal/external network.

In one or more embodiments, a set of pods (e.g., 204A, 204N, etc.) targeted by a service (e.g., 210, 212, etc.) may be determined by a selector that is defined by the master node manager (e.g., 142, FIG. 1.2). Further, if a workload is received (from a client (e.g., 120A, FIG. 1.1)) via hypertext transfer protocol (http), the ingress (which exposes a service to public/external network such that the ingress may receive a request from a client and transfer the request to a corresponding service (which then forwards the request to a corresponding pod)) may manage how that web-based network traffic reaches to a corresponding pod (as indicated, the ingress is not a service type, but the ingress may act as the entry point for the cluster (e.g., 102, FIG. 1.1)).

As described above, the master node manager (e.g., 142, FIG. 1.2) may generate, view, and/or modify service definitions. For example, each of a set of pods may listen on TCP 9376 and may be labelled as "MyApp" (e.g., a label (or a key-value pair) may be used for sending requests from a service to an appropriate endpoint). In this example, (i) the master node manager may define a service (e.g., 210, 212, etc.) to publish that TCP listener, (ii) the defined service may be named as "MyService" with an associated IP address (e.g., IP Address A, which is different from endpoint IP addresses), and (iii) "MyService" will target TCP port 9376 on any pod with the "MyApp" label. As indicated, a port definition of a pod may be referenced in a "target attribute" of a service. Further, "IP Address A" may be a cluster-internal IP address, which means IP Address A may only be reachable from within the cluster (e.g., 102, FIG. 1.1). As yet another example, if a DNS has been enabled throughout the cluster, then all pods may automatically be able to resolve services by their DNS names (e.g., FQDN).

In one or more embodiments, Service B (212) may operate based on a service internal traffic policy (e.g., ".spec.internalTrafficPolicy: Local"), in which Service B's policy may specify internal traffic restrictions to only route internal network traffic to "target" endpoints within a worker node the traffic originated from. As used herein, "internal traffic (or "internal network traffic")" refers to the traffic originated from pods in the current cluster (e.g., 102, FIG. 1.1). Further, Service A (212) may operate based on a second service internal traffic policy (e.g., ".spec.internalTrafficPolicy: Cluster" or ".spec.internalTrafficPolicy: N/A"), in which Service A's policy may specify routing internal traffic to any available "target" endpoints with the cluster.

Additional details of a service are described below in reference to FIG. 3.

Figure 3:
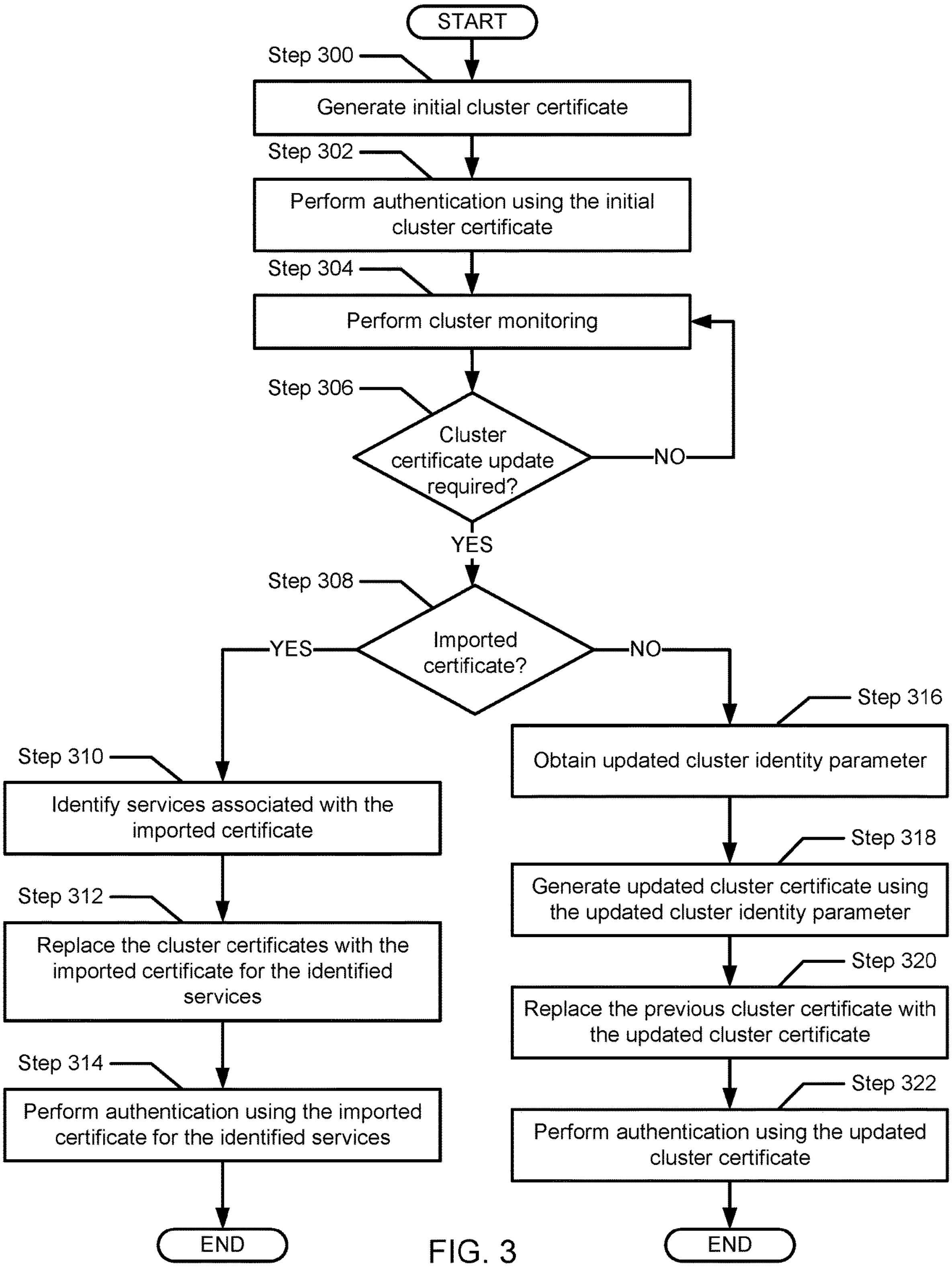
FIG. 3 shows a method for managing authentication in a cluster in accordance with one or more embodiments of the invention.

FIG. 3 shows a method for managing authentication in a cluster (e.g., 102, FIG. 1.1) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3, the method shown in FIG. 3 may be executed by, for example, a master node (e.g., 104A, FIG. 1.1). Other components of the system (100) illustrated in FIG. 1.1 may also execute all or part of the method shown in FIG. 3 without departing from the scope of the invention.

In Step 300, an initial cluster certificate is generated. In one or more embodiments, upon the initial deployment of the cluster, the certificate manager of the master node may generate an initial cluster certificate for at one service and least one corresponding pod. The certificate manager may generate the cluster certificate associated with the pod using any appropriate technique for certificate generation without departing from embodiments disclosed herein. For example, the certificate manager may generate a cluster certificate using a cryptographic algorithm (e.g., Rivest-Shamir-Adleman (RSA), Elliptic Curve Cryptographic (ECC), etc.), a service identifier, a pod identifier (e.g., a pod name), a cluster identity parameter (e.g., an IP address or FQDN associated with the pod), root CA information (e.g., a root certificate, a root CA public and/or private key, user identifiers, client identifiers, etc.), and/or any other information required to generate a cluster certificate without departing from embodiments disclosed herein. The certificate manager may obtain the pod identifier, the cluster identity parameter, and the root CA information from the master node manager, the certificate operator, and/or the root CA manager. There may be multiple cluster certificates generated for each pod for each client and/or user associated with the pod. The master node may maintain the cluster certificate in storage and use it to perform authentication. Alternatively, the master node may mount the cluster certificate to the corresponding pod. In one or more embodiments, the master node may maintain a mapping of pods, cluster certificates, and services. The initial cluster certificate may be generated via other and/or additional methods without departing from embodiments disclosed herein.

In Step 302, authentication is performed using the initial cluster certificate. In one or more embodiments, after the cluster certificate is generated, the cluster certificate may be provided to external services (e.g., authentication services) and/or one or more clients associated with the cluster. The external services and/or the one or more clients may use the cluster certificate to connect to services of the cluster and authenticate communications sent to the pod or corresponding service. In one or more embodiments, the external services (e.g., authentication services) and/or one or more clients may authenticate all communications made to the pod or service of the cluster using the cluster certificate prior to forwarding the communications to the pod. The pod and/or service may also obtain the cluster certificate from the master node and authenticate all obtained communications using the cluster certificate prior to acting on the communications. Authentication may include encrypting and/or decrypting communications using the cluster certificate (e.g., the key included in the certificate) and/or verifying the information included in the communication matches certificate information (e.g., client identifiers, user identifiers, etc.). After authentication is performed on a communication and the communication is verified successfully, the pod may act on the communication by performing one or more actions specified by the communication (e.g., retrieve data, modify a workload, etc.). Authentication may be performed using the initial cluster certificate via other and/or additional methods without departing from embodiments disclosed herein.

In Step 304, cluster monitoring is performed. In one or more embodiments, the master node may perform monitoring by obtaining information regarding cluster configurations from worker nodes and updating the cluster configuration repository (discussed above). Additionally, the master node may perform monitoring by obtain communications from the clients. The communications from clients and/or cluster configurations may specify events that require updating and/or replacing cluster certificates as discussed below. Cluster monitoring may be performed via other and/or additional methods without departing from embodiments disclosed herein.

In Step 306, a determination is made as to whether a cluster certificate update is required. In one or more embodiments, the cluster configuration information and/or a communication from a client may specify a change in the cluster. The change may include a modification of a pod cluster identity parameter, generation of a new pod, the receipt of an imported certificate, and/or any other change requiring the update of a cluster certificate. The master node may monitor the cluster configuration repository and client communications to identify the occurrence of a change requiring updates to a cluster certificate. In one or more embodiments, if the cluster configuration information and/or a client configuration information specifies a change to the cluster has occurred, the master node may determine that a cluster certificate update is required. In one or more embodiments, if the cluster configuration information and/or a client configuration information do not specify a change to the cluster has occurred, the master node may determine that a cluster certificate update is not required and continue monitoring the cluster. The determination as to whether a cluster certificate update is required may be made via other and/or additional methods without departing from embodiments disclosed herein.

In one or more embodiments disclosed herein, if it is determined that a cluster certificate update is required, then the method may proceed to Step 308. In one or more embodiments disclosed herein, if it is determined that a cluster certificate update is required, then the method may proceed to Step 306.

In Step 308, a determination is made as to whether the cluster certificate update is associated with an imported certificate. In one or more embodiments, the change identified above requiring and updated to a cluster certificate may include an imported certificate to replace a cluster certificate. For example, the master node may obtain a communication from a client that includes an imported certificate and/or includes a request to replace a cluster certificate with an imported certificate. In one or more embodiments, if the change includes obtaining an imported certificate and/or a request to replace a cluster certificate with an imported certificate, the master node may determine that the cluster certificate update is associated with an imported certificate. In one or more embodiments, if the change does not include obtaining an imported certificate and/or a request to replace a cluster certificate with an imported certificate, the master node may determine that the cluster certificate update is not associated with an imported certificate. The determination as to whether the cluster certificate update is associated with an imported certificate may be made via other and/or additional methods without departing from embodiments disclosed herein.

In one or more embodiments disclosed herein, if it is determined that the cluster certificate update is associated with an imported certificate, then the method may proceed to Step 310. In one or more embodiments disclosed herein, if it is determined that the cluster certificate update is not associated with an imported certificate, then the method may proceed to Step 316.

In Step 310, services associated with the imported certificate are identified. As discussed above, the master node may obtain a communication from a client including an imported certificate and/or requesting replacement of cluster certificate using an imported certificate. In one or more embodiments, the communication may specify one or more services (i.e., service identifiers) and/or pods (i.e., pod identifiers) that are associated with the imported certificate. The master node may parse the communication to identify the services associated with the imported certificate. Alternatively, if only pods are specified in the communication or if only an existing cluster certificate is specified, the master node may use one or more mappings of cluster certificates, pods, and services to identify the services associated with the imported certificate. The mappings may be one or more data structures generated and/or maintained by the master node (e.g., the master node manager, certificate manager, etc.) that specify the pods and cluster certificates associated with each service. The mappings may be stored in a storage of (or operatively connected to) the master node. Services associated with the imported certificate may be identified via other and/or additional methods without departing from embodiments disclosed herein.

In Step 312, the cluster certificates are replaced with the imported certificate for the identified services. In one or more embodiments, the master node may identify the at least one cluster certificate associated with the services using the mappings. The master node may update the mappings to specify that the services and corresponding pods are now associated with the imported certificate obtained from the client. The master node may then include a copy of the imported certificate and/or provide the imported certificate (e.g., via mounting) to the pods associated with the imported certificate. If no other services are using the replaced cluster certificates, the master node may also delete the replaced cluster certificates. The cluster certificates may be replaced with the imported certificates for the identified services via other and/or additional methods without departing from embodiments disclosed herein.

In Step 314, authentication is performed using the imported certificate for the identified services. In one or more embodiments, after a cluster certificate is replaced with an imported certificate, the imported certificate may be provided to external services (e.g., authentication services) and/or one or more clients associated with the cluster. The external services and/or the one or more clients may use the imported certificate to connect to services of the cluster and authenticate communications sent to the pod(s) or corresponding service(s). In one or more embodiments, the external services (e.g., authentication services) and/or one or more clients may authenticate all communications made to the pod or service of the cluster using the imported certificate prior to forwarding the communications to the pod. A corresponding pod and/or service may also obtain the imported certificate from the master node and authenticate all obtained communications using the imported certificate prior to acting on the communications. Authentication may include encrypting and/or decrypting communications using the imported certificate (e.g., using the key included in the certificate) and/or verifying the information included in the communication matches certificate information (e.g., client identifiers, user identifiers, etc.). After authentication is performed on a communication and the communication is verified successfully, the pod may act on the communication by performing one or more actions specified by the communication (e.g., retrieve data, modify a workload, etc.). Authentication may be performed using the imported certificate via other and/or additional methods without departing from embodiments disclosed herein.

In Step 316, an updated cluster identity parameter is obtained. In one or more embodiments, the master node may obtain an updated cluster identity parameter from the master node manager and/or the certificate operator that generates updated cluster identity parameters. In one or more embodiments, the cluster operator may obtain a new or updated IP address, FQDN, and/or other identifying parameter associated with a modified or newly deployed pod from the master node manager. The certificate operator may generate an updated cluster identity parameter using the new or updated IP address and/or FQDN. The updated cluster identity parameter may be obtained via other and/or additional methods without departing from embodiments disclosed herein.

In Step 318, an updated cluster certificate is generated using the updated cluster identity parameter. In one or more embodiments, upon obtaining the updated cluster identity parameter, the certificate manager of the master node may generate an updated cluster certificate for at one service and least one corresponding pod associated with the updated cluster identity parameter. The certificate manager may generate the updated cluster certificate associated with the pod using any appropriate technique for certificate generation without departing from embodiments disclosed herein. For example, the certificate manager may generate a cluster certificate using a cryptographic algorithm (e.g., RSA, ECC, etc.) a pod identifier (e.g., a pod name), a service identifier, the updated cluster identity parameter (e.g., an IP address or FQDN associated with the pod), root CA information (e.g., a root certificate, a root CA public and/or private key, user identifiers, client identifiers, etc.), etc. The certificate manager may obtain the pod identifier, the updated cluster identity parameter, and the root CA information from the master node manager, the certificate operator, and/or the root CA manager. The master node may maintain the updated cluster certificate in storage and use it to perform authentication. Alternatively, the master node may mount the updated cluster certificate to the corresponding pod. The updated cluster certificate may be generated using the updated cluster identity parameter via other and/or additional methods without departing from embodiments disclosed herein.

In Step 320, the previous cluster certificate may be replaced with the updated cluster certificate. In one or more embodiments, the master node may identify the at least one cluster certificate associated with the updated identity parameter. The master node may update the mappings to specify that the services and corresponding pods are now associated with the updated cluster certificate. The master node may then include a copy of the updated cluster certificate and/or provide the updated cluster certificate (e.g., via mounting) to the pod associated with the updated cluster certificate. If no other services are using the replaced cluster certificate, the master node may also delete the replaced cluster certificate. The previous cluster certificate may be replaced with the updated cluster certificate via other and/or additional methods without departing from embodiments disclosed herein.

In Step 322, authentication is performed using the updated cluster certificate. In one or more embodiments, after a cluster certificate is replaced with an updated cluster certificate, the updated cluster certificate may be provided to external services (e.g., authentication services) and/or one or more clients associated with the cluster. The external services and/or the one or more clients may use the updated cluster certificate to connect to services of the cluster and authenticate communications sent to the pod or corresponding service. In one or more embodiments, the external services (e.g., authentication services) and/or one or more clients may authenticate all communications made to the pod or service of the cluster using the updated cluster certificate prior to forwarding the communications to the pod. A corresponding pod(s) and/or service(s) may also obtain the updated cluster certificate from the master node and authenticate all obtained communications using the updated cluster certificate prior to acting on the communications. Authentication may include encrypting and/or decrypting communications using the updated cluster certificate (e.g., using the key included in the certificate) and/or verifying the information included in the communication matches certificate information (e.g., client identifiers, user identifiers, etc.). In one or more embodiments, the initial cluster certificate may be provided to one or more clients. The clients may use the initial cluster certificate to connect with one or more services of the cluster and authenticate communications to one or more services of the cluster. After authentication is performed on a communication and the communication is verified successfully, the pod may act on the communication by performing one or more actions specified by the communication (e.g., retrieve data, modify a workload, etc.). Authentication may be performed using the updated cluster certificate via other and/or additional methods without departing from embodiments disclosed herein.

In one or more embodiments, the method may end following Step 322.

To further clarify embodiments of the invention, a non-limiting example use case is provided in FIGS. 4.1-4.3.

Start of Example

The example use case, illustrated in FIGS. 4.1-4.3, is not intended to limit the scope of the embodiments disclosed herein and is independent from any other examples discussed in this application. FIGS. 4.1-4.3 illustrate an example communication authentication procedure.

Turning now to FIG. 4.1, FIG. 4.1 shows a diagram of the example cluster and a client. For the sake of brevity, not all components included in the systems of FIGS. 1.1-1.3 or involved in the example Kubernetes cluster may be discussed in FIGS. 4.1-4.3.

Assume here that (i) Worker Node A (404A) hosts multiple pods (e.g., Pod A1 (404A), Pod N1 (404N), etc.), (ii) Worker Node B (404B) hosts multiple pods (e.g., Pod A2 (408A), Pod N2 (408N), etc.), and (iii) pod A1 (406A) and pod N1 (406N) are connected to Service A (410) and pod A2 (408A) and pod N2 (408N) are connected to Service B (412).

At Step 1, the client (400) requests deployment of the pods on in the aforementioned configuration. In response to the deployment, at Step 2, the worker nodes (404A, 404B) provide the configuration information specifying the configuration to the master node (402). After obtaining the configuration information, at Step 3, the master node (402) generates initial cluster certificates for each of the pods (406A, 406N, 408A, 408N) using the cluster identity parameters included in the configuration information. At Step 4, the master node (402) provides the initial cluster certificates to the worker nodes (404A, 404B) and therefore the pods (406A, 406N, 408A, 408N). After obtaining the initial cluster certificates, at Step 5, the pods (406A, 406N, 408A, 408N) perform authentication on all communications using the initial cluster certificates.

Turning now to FIG. 4.2, FIG. 4.2 shows a diagram of the same example system discussed above in FIG. 4.1. Assume here that the cluster has been configured and initial cluster certificates have been generated as discussed in FIG. 4.1.

At Step 1, pod A3 (414A) through pod N3 (414N) have been deployed on newly added worker node C (404C) and are connected to service B (412). In response to the deployment, at Step 2, worker node C (404C) provides configuration information to the master node (402). After obtaining the configuration information associated with worker node C (404C), at Step 3, the master node (402) generates updated cluster identity parameters associated with the newly deployed nodes (e.g., 414A, 414N) and automatically generates updated cluster certificates associated with the newly deployed nodes (e.g., 414A, 414N) based on the change to the cluster. At Step 4, the master node (402) provides the updated cluster certificates to worker node C (404C) and therefore its pods (414A, 414N). After obtaining the updated cluster certificates, at Step 5, the pods (414A, 414N) perform authentication on all communications using the updated cluster certificates. Meanwhile, the other pods (406A, 406N, 408A, 408N) continue to perform authentication on all communications using the initial certificates generated as discussed in FIG. 4.1.

Turning now to FIG. 4.3, FIG. 4.3 shows a diagram of the same example system discussed above in FIG. 4.1. Assume here that the cluster has been configured and initial cluster certificates have been generated as discussed in FIG. 4.1.

Initially, at Step 1, the client (400) sends a communication including imported certificates generated by a user of the client (400) and a request to replace the initial cluster certificates for service A (410) with the imported certificates. In response to obtaining the communication, the master node (402) parses the communication and identifies that service A (410) is associated with the imported certificates. Based on the identification, at Step 3, the master node (402) replaces the initial certificates associated with pod A1 (406A) through pod N1 (406N) with the corresponding imported certificates. After that, at Step 4, the master node (402) provides the imported certificates to worker node A (404A) and therefore its pods (406A, 406N). After obtaining the imported certificates, at Step 5, the pods (406A, 406N) perform authentication on all communications using the imported certificates. Meanwhile, at Step 6, the other pods (408A, 408N) continue to perform authentication on all communications using the initial certificates which were generated as discussed in FIG. 4.1.

End of Example

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing authentication in a cluster, comprising:

generating, by a node of a cluster, at least one initial cluster certificate using at least one cluster identity parameter, wherein:
- the cluster comprises a plurality of worker nodes,
- the plurality of worker nodes host a plurality of pods,
- the plurality of pods comprise a plurality of containers, and
- the plurality of containers comprise a plurality of services;

performing authentication for the cluster using the at least one initial cluster certificate;

making a determination that a cluster certificate update is required, wherein making the determination comprises:
- monitoring the cluster;
- identifying a change in the cluster; and
- obtaining a new cluster identity parameter, a pod identifier, and a service identifier associated with the change;

in response to the determination:
- generating an updated certificate using:
  - the new cluster identity parameter;
  - a cryptographic algorithm;
  - the pod identifier; and
  - the service identifier;
- replacing the at least one initial cluster certificate using the updated certificate;

performing authentication for the cluster using the updated certificate, wherein performing authentication for the cluster using the updated certificate comprises authenticating communications for a first subset of the plurality of services using the updated certificate while simultaneously authenticating communications for a second subset of the plurality of services using the at least one initial cluster certificate;

making, in response to performing authentication for the cluster using the updated certificate, a second determination that no service of the plurality of services remains associated with a second initial certificate; and deactivating, in response to the second determination, the second initial certificate.

2. The method of claim 1, wherein the new cluster identity parameter comprises a new network address associated with the cluster.

3. The method of claim 1, wherein the new cluster identity parameter comprises a new fully qualified domain name associated with the cluster.

4. The method of claim 1, wherein the new cluster identity parameter comprises a new domain associated with the cluster.

5. The method of claim 1, wherein obtaining the updated certificate comprises generating the updated certificate using the new cluster identity parameter.

6. The method of claim 5, wherein performing authentication for the cluster using the updated certificate comprises authenticating communications associated with cluster using the updated certificate by at least one client of a plurality of clients while connecting to at least one service of the plurality of services.

7. The method of claim 1, wherein making the determination that the cluster certificate update is required comprises:

monitoring the cluster; and obtaining a message from a client of a plurality of clients comprising an imported certificate and specifying a portion of the plurality of services associated with the imported certificate.

8. The method of claim 7, wherein the imported certificate is generated by a user of the client.

9. The method of claim 7, wherein replacing the at least one initial cluster certificate with the updated certificate comprises replacing the at least one initial cluster certificate with the imported certificate for the portion of the plurality of services.

10. The method of claim 9, wherein the performing authentication for the cluster using the updated certificate comprises:

authenticating communications associated with the portion of the plurality of services using the imported certificate; and authenticating communications associated with a remaining portion of the plurality of services using the at least one initial cluster certificate.

11. A non-transitory computer readable medium comprising computer readable program code, which when executed by a computer processor enables the computer processor to perform a method for managing authentication in a cluster, the method comprising:

generating, by a node of a cluster, at least one initial cluster certificate using at least one cluster identity parameter, wherein:

the cluster comprises a plurality of worker nodes, the plurality of worker nodes host a plurality of pods, the plurality of pods comprise a plurality of containers, and the plurality of containers comprise a plurality of services;

performing authentication for the cluster using the at least one initial cluster certificate;

making a determination that a cluster certificate update is required, wherein making the determination comprises:

monitoring the cluster;

identifying a change in the cluster; and obtaining a new cluster identity parameter, a pod identifier, and a service identifier associated with the change;

in response to the determination:

generating an updated certificate using:

the new cluster identity parameter;

a cryptographic algorithm;

the pod identifier; and the service identifier;

replacing the at least one initial cluster certificate using the updated certificate;

performing authentication for the cluster using the updated certificate, wherein performing authentication for the cluster using the updated certificate comprises authenticating communications for a first subset of the plurality of services using the updated certificate while simultaneously authenticating communications for a second subset of the plurality of services using the at least one initial cluster certificate;

making, in response to performing authentication for the cluster using the updated certificate, a second determination that no service of the plurality of services remains associated with a second initial certificate; and deactivating, in response to the second determination, the second initial certificate.

12. The non-transitory computer readable medium of claim 11, wherein the new cluster identity parameter comprises a new network address associated with the cluster.

13. The non-transitory computer readable medium of claim 11, wherein obtaining the updated certificate comprises generating the updated certificate using the new cluster identity parameter.

14. The non-transitory computer readable medium of claim 13, wherein performing authentication for the cluster using the updated certificate comprises authenticating communications associated with cluster using the updated certificate by at least one client of a plurality of clients while connecting to at least one service of the plurality of services.

15. The non-transitory computer readable medium of claim 11, wherein making the determination that the cluster certificate update is required comprises:

monitoring the cluster; and obtaining a message from a client comprising an imported certificate and specifying a portion of the plurality of services associated with the imported certificate.

16. The non-transitory computer readable medium of claim 15, wherein the imported certificate is generated by a user of the client.

17. The non-transitory computer readable medium of claim 15, wherein replacing the at least one initial cluster certificate with the updated certificate comprises replacing the at least one initial cluster certificate with the imported certificate for the portion of the plurality of services.

18. The non-transitory computer readable medium of claim 17, wherein the performing authentication for the cluster using the updated certificate comprises:

authenticating communications associated with the portion of the plurality of services using the imported certificate; and authenticating communications associated with a remaining portion of the plurality of services using the at least one initial cluster certificate.

* * * * *